(12) United States Patent
Goode et al.

(10) Patent No.: US 7,629,422 B2
(45) Date of Patent: Dec. 8, 2009

(54) PROCESS FOR TRANSITIONING BETWEEN ZIEGLER-NATTA-BASED AND CHROMIUM-BASED CATALYSTS

(75) Inventors: Mark G. Goode, Hurricane, WV (US); Kevin J. Cann, Rocky Hill, NJ (US); F. David Hussein, Cross Lanes, WV (US); Robert L. Santana, Baytown, TX (US); David C. Schutz, Victoria, TX (US); Agapios K. Agapiou, Humble, TX (US)

(73) Assignee: Univation Technologies, LLC, Houston, TX (US)

( * ) Notice: Subject to any disclaimer, the term of this patent is extended or adjusted under 35 U.S.C. 154(b) by 441 days.

(21) Appl. No.: 11/312,272

(22) Filed: Dec. 20, 2005

(65) Prior Publication Data

US 2006/0160965 A1    Jul. 20, 2006

Related U.S. Application Data

(60) Provisional application No. 60/637,829, filed on Dec. 21, 2004.

(51) Int. Cl.
*C08F 2/38* (2006.01)
*C08F 2/34* (2006.01)
*C08F 210/08* (2006.01)

(52) U.S. Cl. .............................. 526/84; 526/82; 526/83; 526/901

(58) Field of Classification Search .................... 526/83, 526/84, 82, 901
See application file for complete search history.

(56) References Cited

U.S. PATENT DOCUMENTS

| | | | |
|---|---|---|---|
| 4,460,755 A * | 7/1984 | Williams et al. | .............. 526/84 |
| 4,547,555 A * | 10/1985 | Cook et al. | .................... 526/60 |
| 5,391,657 A | 2/1995 | Song et al. | |
| 5,442,019 A | 8/1995 | Agapiou et al. | |
| 5,672,666 A | 9/1997 | Muhle et al. | |
| 6,028,140 A | 2/2000 | Collina et al. | |
| 6,284,849 B1 | 9/2001 | Almquist et al. | |
| 2004/0138391 A1 * | 7/2004 | Burdett et al. | ................. 526/88 |
| 2004/0181016 A1 | 9/2004 | Agapiou et al. | |

FOREIGN PATENT DOCUMENTS

| | | |
|---|---|---|
| EP | 0 751 965 | 3/1998 |
| JP | 62232404 | 10/1987 |
| JP | 1997095509 | 4/1997 |

* cited by examiner

*Primary Examiner*—Fred M Teskin
(74) *Attorney, Agent, or Firm*—Kevin M. Faulkner; Leandro Arechederra, III

(57) ABSTRACT

Embodiments of our invention relate to processes for transitioning among polymerization catalyst systems including processes for transitioning among olefin polymerization reactions using Ziegler-Natta catalysts systems and chromium-based catalyst systems. Among embodiments contemplated are a method of transitioning from a first catalyst to a second catalyst in an olefin polymerization reactor, comprising: adding to the reactor a deactivating agent (DA) selected from one of carbon monoxide, carbon dioxide, or combinations thereof; adding to the reactor a cocatalyst adsorbing agent (CAA), comprising an inorganic oxide selected from one of silica, alumina or combinations thereof; wherein the first catalyst comprises at least one conventional Ziegler-Natta catalyst, and a cocatalyst, wherein the second catalyst comprises at least one chromium-based catalyst, wherein the reactor is a gas-phase, fluidized bed reactor, and wherein the CAA is substantially free of transition metals. In another embodiment a method of transitioning from a first catalyst to a second catalyst in an olefin polymerization reactor is contemplated, comprising: adding a transition aid agent (TAA) wherein the TAA is selected from one of alkoxylated amines, alkoxylated amides, or combinations thereof, wherein the first catalyst comprises at least one Ziegler-Natta catalyst comprising the catalyst, a cocatalyst and optionally a support, and the second catalyst comprises at least one chromium-based catalyst.

43 Claims, 14 Drawing Sheets

Triethyl Aluminum Adsorption on Silica

| Absorption of Aluminum Triethyl Aluminum on Silica in Hexane and THF Media ||||||
|---|---|---|---|---|
| Silica Type | Reagent | Solvent | Total mmol Al/g | mmol Reagent/g Absorbed |
| 955-600 | TEAL | Hexane | 1.38 | 1.38 |
| 955-600/TOS | TEAL | Hexane | 1.30 | 0.81 |
| 955-200 | TEAL (fast) | Hexane | 1.49 | 1.49 |
| 955-200 | TEAL (slow) | Hexane | 1.48 | 1.48 |
| 952-600 | TEAL | THF | 0.75 | 0.75 |

Fig. 7
ATMER-163 Kill Profiles for Slurried Spray Dried Ziegler-Natta Catalyst
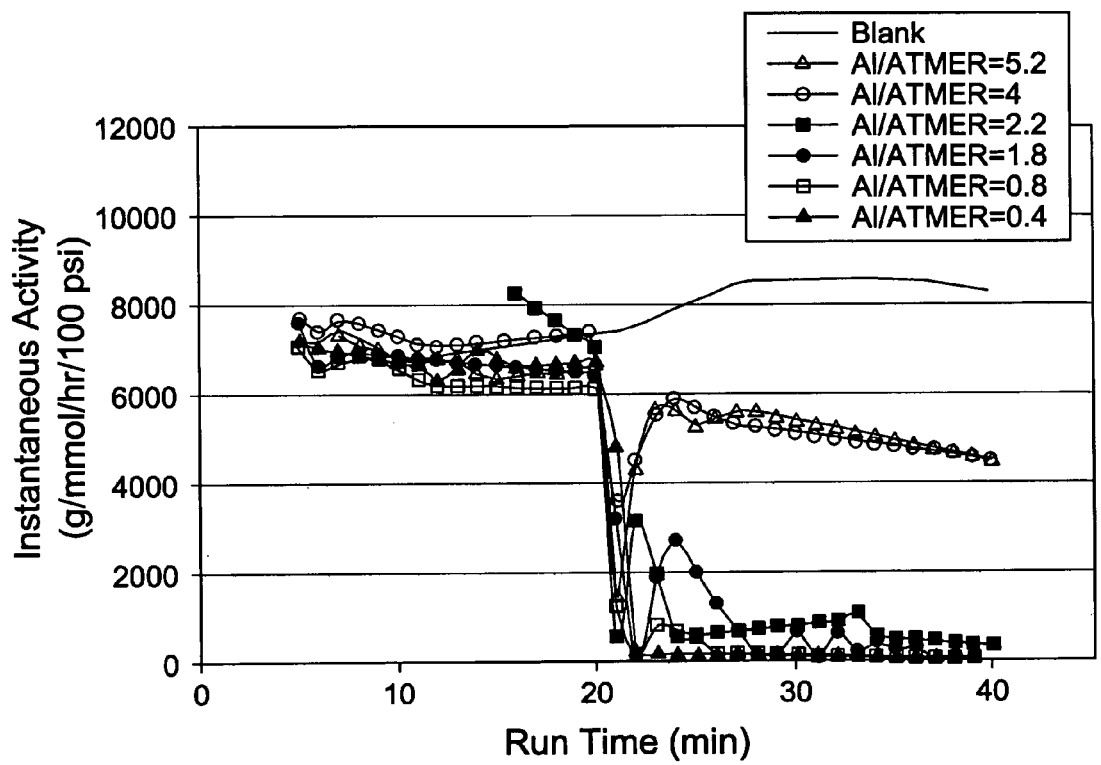
ATMER as Kill Agent for Slurried Spray Dried Ziegler-Natta Catalyst
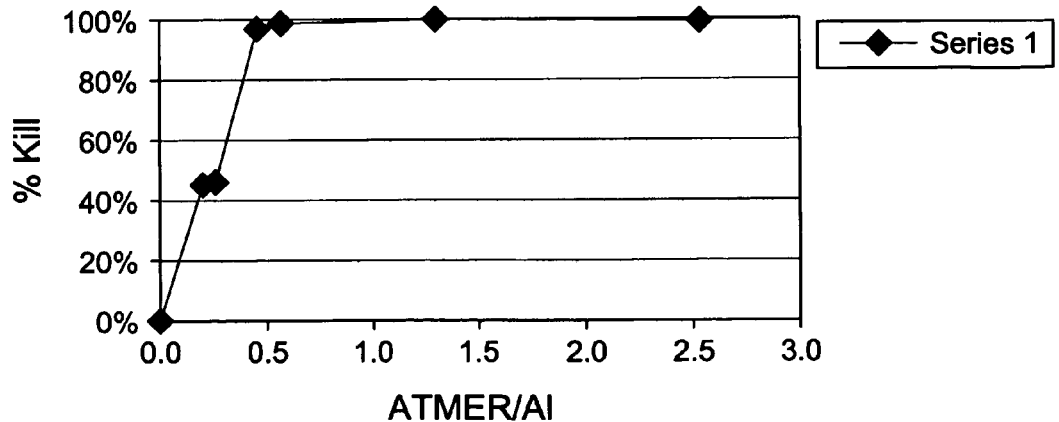

Fig. 8  Oleic Acid Addition to Interrupted Polymerization of Dry Particulate Ziegler-Natta Catalyst

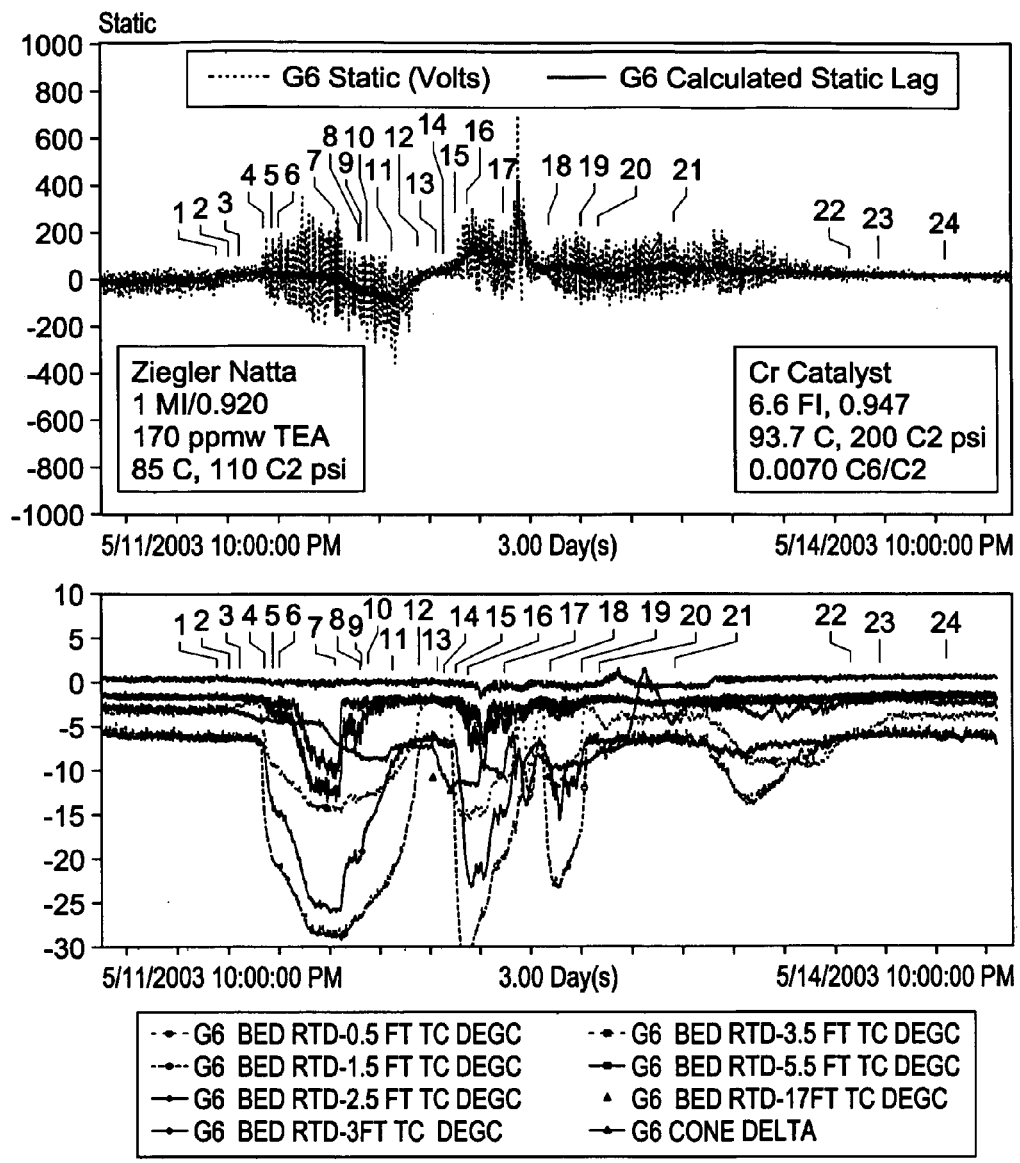

1. 07:00 TEA off
2. 08:00 Ziegler catalyst off
3. 08:45 Hexene off
4. 10:50 86 g of 200C silica to bed
5. 11:25 Start CO addition
6. 11:55 Finished CO - 4ppmv
7. 16:20 10 wt% AS-990 at 5 cc/hr to bed
8. 18:20 AS-990 off
9. 18:25 Decreased SGV 2.1 to 1.8 ft/sec
10. 18:55 10 st% AS-990 back on 5 cc/hr
11. 21:00 SGV increased to 2.2 ft/sec
12. 23:05 AS-990 off
13. 00:30 SGV decreased to 1.8 ft/sec
14. 01:00 Increasing T to 92C & C2 to 200 psi - H2/C2 constant
15. 02:00 Temperature reaches 92C
16. 03:00 Ethylene reaches about 195 psi
17. 06:00 Rx blowdown and N2 purge
18. 09:30 At Cr catalyst Conditions, C2 at 180 psi - Cr catalyst on
19. 12:00 Cr catalyst from 2 to 3 shots/min
20. 13:25 Cr catalyst to 5 shots/min
21. 19:30 Bed wt to 180 lbs and Cr Cat to 3.5 shots/min
22. 09:20 Increasing C2 - 180 to 200 psi
23. 11:30 Decreasing H2/C2 - 0.16 to 0.05
24. 16:50 Increasing T from 92 to 93.7C

Fig. 11

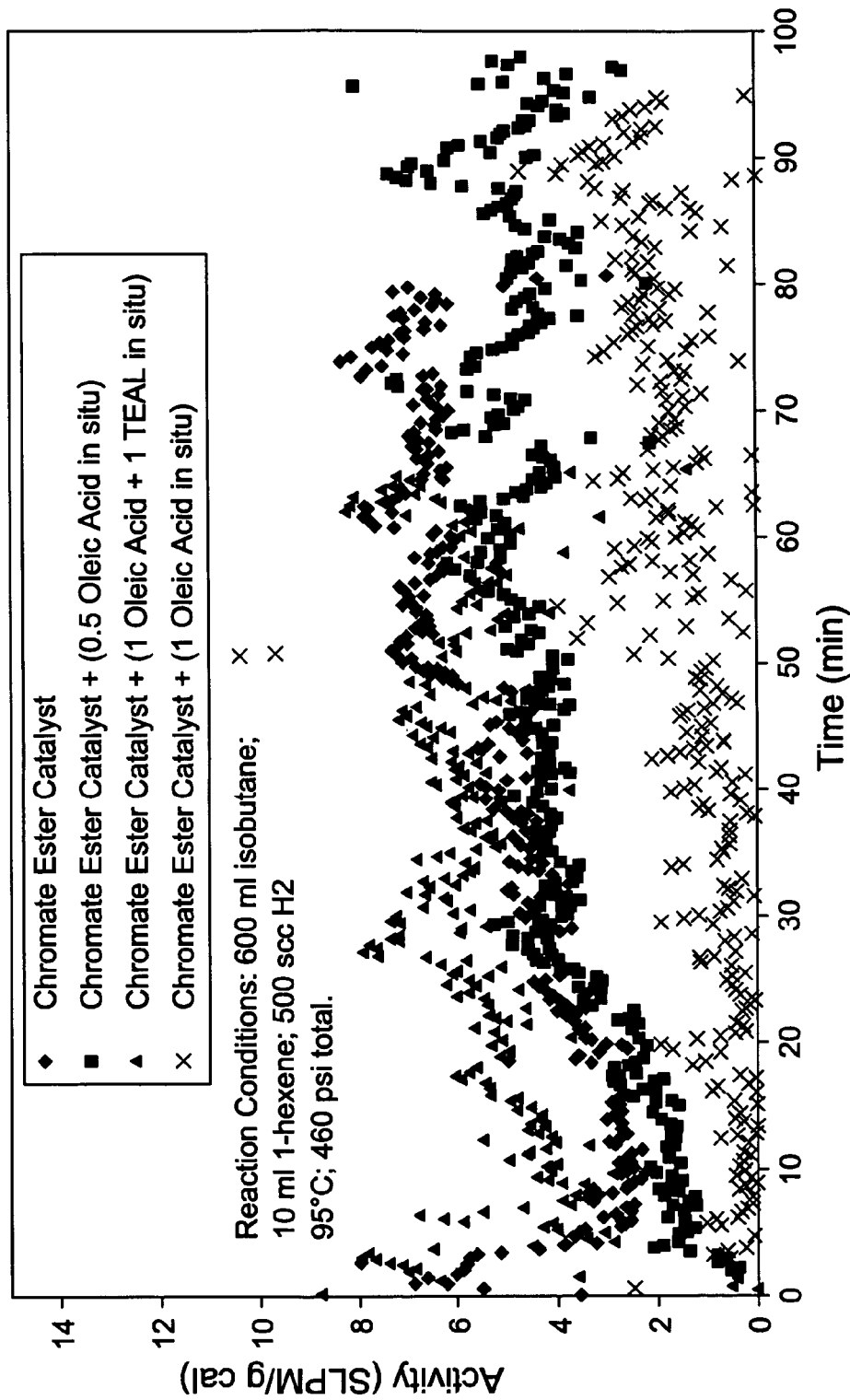
Fig. A

PROCESS FOR TRANSITIONING BETWEEN ZIEGLER-NATTA-BASED AND CHROMIUM-BASED CATALYSTS

CROSS REFERENCE TO RELATED APPLICATIONS

This application claims the benefit of Ser. No. 60/637,829, filed Dec. 21, 2004.

TECHNICAL FIELD

Embodiments of our invention relate to processes for transitioning among polymerization catalyst systems including processes for transitioning among olefin polymerization reactions using Ziegler-Natta catalysts systems and chromium-based catalyst systems.

BACKGROUND

During the production of olefin polymers in a commercial reactor, it is often necessary to transition from one type of catalyst system producing polymers having certain characteristics and properties to another catalyst system capable of producing polymer of different chemical and/or physical attributes. Transitions between similar Ziegler-Natta catalyst systems or other compatible systems is relatively easy. However, where the catalyst systems are incompatible, the transition process is usually complicated. For example, when transitioning between traditional Ziegler-Natta catalyst systems and chromium-based systems, high molecular weight resin agglomerates will form. These agglomerations can form gels in films made with the resulting resin, rendering the final product unacceptable. Consequently, it is desirable to avoid the presence of active Ziegler-Natta catalyst systems when using chromium-based catalysts. Such Ziegler-Natta catalyst systems may comprise a transition metal compound and a cocatalyst, which is often a trialkyl aluminum compound.

In the past, an effective transition between Ziegler-Natta catalyst systems that contain cocatalysts such as trialkyl aluminum compounds and chromium-based catalyst systems was accomplished by first stopping the first catalyzed polymerization process using various techniques known in the art. The reactor was then emptied, recharged and a second catalyst system was introduced into the reactor. Such catalyst transitions, however, are time consuming and costly due to the need to shut down the reactor for an extended period of time.

It would be highly beneficial, therefore, to employ a process for transitioning between incompatible catalysts without the need for halting the polymerization reaction, emptying the reactor and then restarting the reactor with a different catalyst system. It would also be desirable to employ a transition process which reduces the amount of off-grade material produced during the transition, reduces the time for the transaction, increases the robustness and stability of the transition process and avoids the need to open the reactor to charge the seed bed.

SUMMARY

Among embodiments contemplated are a method of transitioning from a first catalyst to a second catalyst in an olefin polymerization reactor, comprising: adding to the reactor a deactivating agent (DA) selected from one of carbon monoxide, carbon dioxide, or combinations thereof; adding to the reactor a cocatalyst adsorbing agent (CAA), comprising an inorganic oxide selected from one of silica, alumina or combinations thereof; wherein the first catalyst comprises at least one conventional Ziegler-Natta catalyst, and a cocatalyst, wherein the second catalyst comprises at least one chromium-based catalyst, wherein the reactor is a gas-phase, fluidized bed reactor, and wherein the CAA is substantially free of transition metals.

Another embodiment is a method of transitioning from a first catalyst to a second catalyst in an olefin polymerization reactor, comprising: adding to the reactor a deactivating agent (DA); adding to the reactor a cocatalyst adsorbing agent (CAA), comprising an inorganic oxide selected from one of silica, alumina or combinations thereof; and wherein the CAA is substantially free of transition metals.

In another embodiment a method of transitioning from a first catalyst to a second catalyst in an olefin polymerization reactor is contemplated, comprising: adding a transition aid agent (TAA) wherein the TAA is selected from one of alkoxylated amines, alkoxylated amides, or combinations thereof, wherein the first catalyst comprises at least one Ziegler-Natta catalyst comprising the catalyst, a cocatalyst and optionally a support, and the second catalyst comprises at least one chromium-based catalyst.

In yet another embodiment, a method of transitioning from a first catalyst to a second catalyst in an olefin polymerization reactor is contemplated, comprising: adding a cocatalyst adsorbing agent (CAA); adding a deactivating agent (DA); wherein the CAA comprises an inorganic oxide, substantially free of transition metals.

In still another embodiment a method of transitioning from a first catalyst to a second catalyst in an olefin polymerization reactor is contemplated, comprising: first adding an organo metallic compound represented by one of the formulas: $BR_3$ or $AlR_{(3-a)}X_a$, where R is a hydride, branched or straight chain alkyl, cycloalkyl, heterocycloalkyl, aryl radical having from 1 to 30 carbon atoms, X is a halogen and a is 0, 1 or 2, to a cocatalyst adsorbing agent (CAA); then adding the CAA with said organometallic compound to said reactor; wherein the CAA comprises an inorganic oxide, substantially free of transition metals.

DESCRIPTION OF THE DRAWINGS

FIG. 7 shows the effectiveness of Atmer™-163, a C13-C15 ethoxylated amine available from Ciba Specialty Chemical, in terminating an ongoing spray dried, slurry Ziegler-Natta catalyst in laboratory slurry ethylene polymerization reaction.

FIG. 10-13 show annotated reactor static voltage probe and reactor wall skin thermocouple responses for non-optimized pilot-scale transitions from Ziegler-Natta to chromium-based catalysts using methods and procedures discussed briefly here and in greater detail in the examples section.

FIG. A demonstrates the effect of Oleic acid and triethyl aluminum on chromate ester based catalyst, with varying levels of oleic acid.

DESCRIPTION

For a more complete understanding of the present invention, reference is now made to the following descriptions taken in conjunction with the accompanying drawings. The Ziegler-Natta catalyst system can be exemplified by the magnesium/titanium catalyst system described in U.S. Pat. Nos. 4,302,565 and 4,460,755, and the pre-activation procedure using a mixture of organometallic compounds as described in U.S. Pat. No. 6,187,666. The catalysts so prepared are typically dry, free-flowing powders. Another Ziegler-Natta catalyst system is one where the precursor is formed by spray drying and used in slurry form. Such a catalyst, for example contains titanium, magnesium, and electron donor, and optionally, and aluminum halide. The catalyst is then introduced into a hydrocarbon medium such as mineral oil to provide the slurry form. Such a spray dried slurry catalyst is described in U.S. Pat. Nos. 4,293,673 and 5,290,745.

Figure 1:
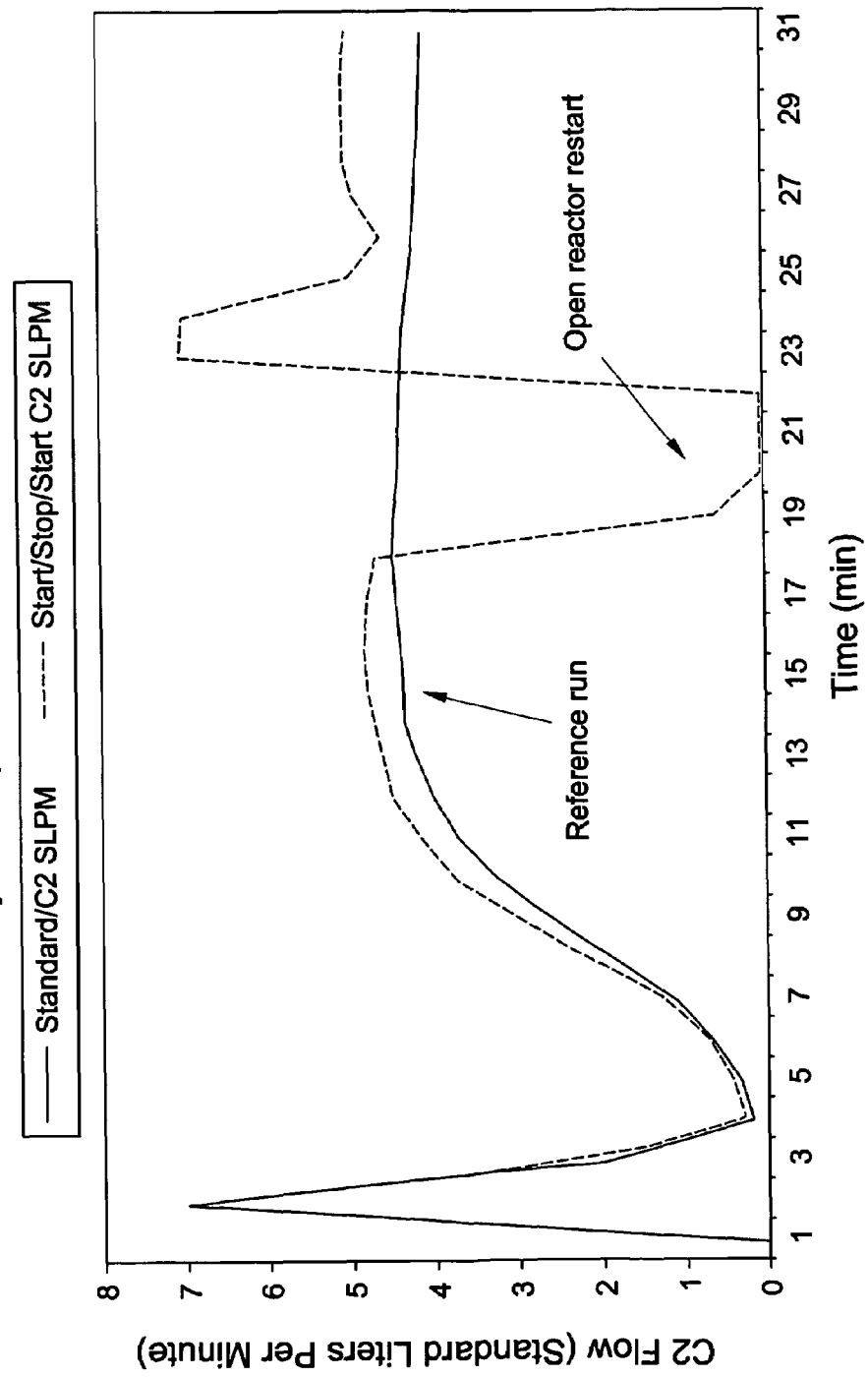
FIG. 1 is a plot of the ethylene uptake for laboratory batch polymerizations in hexane slurry using a spray dried, slurry Ziegler-Nat catalyst at an 85° C. reaction temperature, 100 psi ethylene partial pressure and a 40:1 tri-ethyl aluminum (TEAL) cocatalyst to titanium mole ratio.

FIG. 1 is a plot of the ethylene uptake for laboratory batch polymerizations in hexane slurry using a spray dried, slurry Ziegler-Natta catalyst at an 85° C. reaction temperature, 100 psi ethylene partial pressure and a 40:1 tri-ethyl aluminum (TEAL) cocatalyst to titanium mole ratio. The reference case is for 30 minutes of polymerization. In the second case, the ethylene feed was interrupted and the ethylene removed via a vent form the reaction vessel after 18 minutes to stop the polymerization, and after four minutes the ethylene feed and concentration were reestablished. The polymerization continued at approximately the same rate after ethylene was restored as before the vessel was vented.

Figure 2:
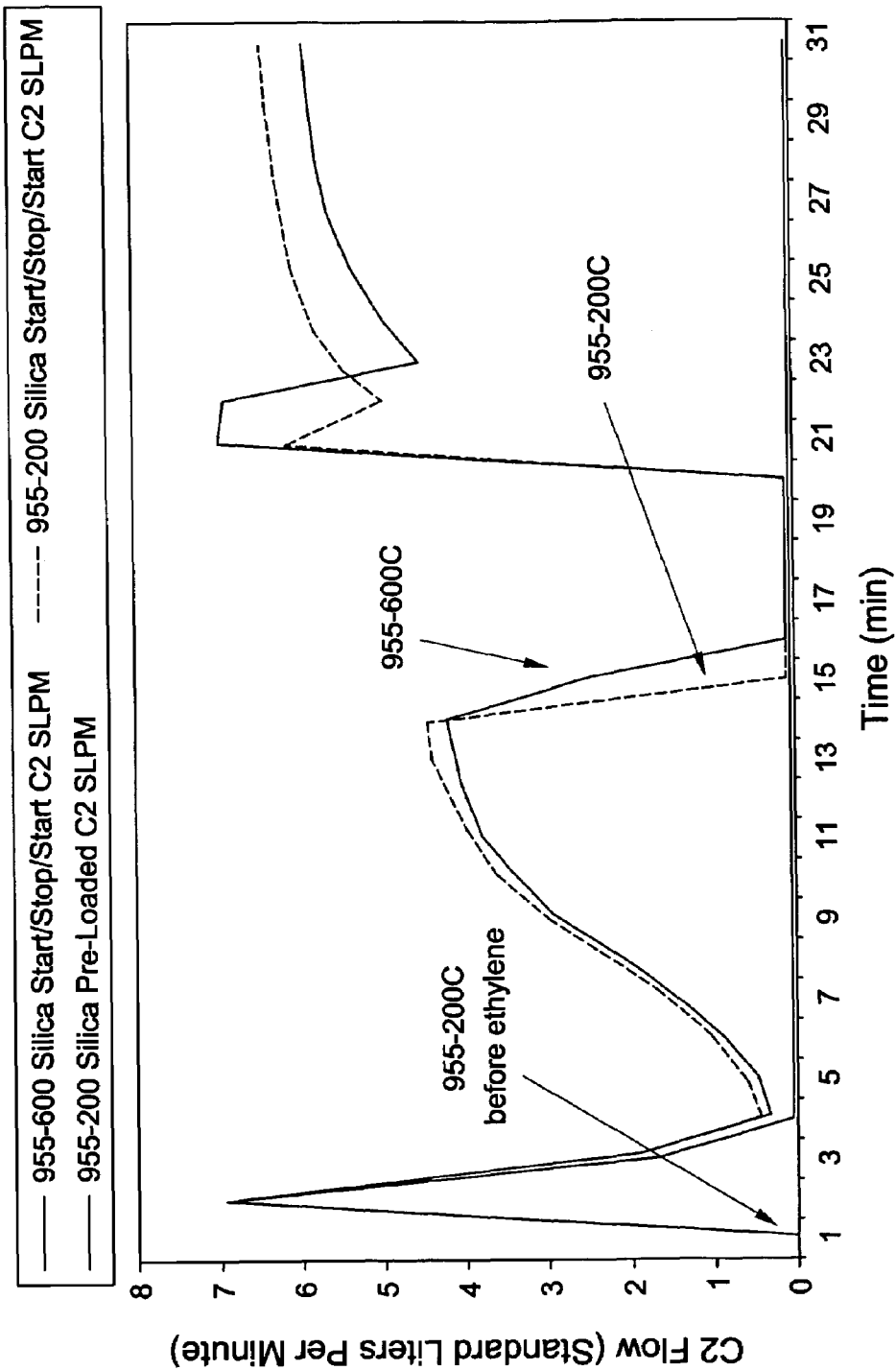
FIG. 2 is a plot of the ethylene uptake for a laboratory batch polymerization in hexane slurry using a spray dried, slurry Ziegler-Natta catalyst at an 85° C. reaction temperature, 100 psi ethylene partial pressure and a 40:1 TEAL cocatalyst to titanium mole ratio for three cases.

FIG. 2 is a plot of the ethylene uptake for a laboratory batch polymerization in hexane slurry using a spray dried, slurry Ziegler-Natta catalyst at an 85° C. reaction temperature, 100 psi ethylene partial pressure and a 40:1 TEAL cocatalyst to titanium mole ratio for three cases, which demonstrate the effect of adding Grace Davison 955 silica dehydrated at either 200° or 600° C. The silica dehydrated at 200° C. was added to excess, greater than that stoichometrically required to react with all the TEAL, and the silica dehydrated at 600° C. was added stoichometrically to the TEAL at a 0.6 mmole TEAL/g silica ratio. In the first case, the addition of 955 silica (dehydrated at 200° C.) to the polymerization reactor after the introduction of catalyst and TEAL cocatalyst, but prior to the introduction of ethylene resulted in no polymerization. In the second and third cases, the ongoing polymerization reaction was interrupted after 14 minutes by stopping the ethylene feed and removing the ethylene by venting the polymerization vessel. Either the silica dehydrated at 200° C. or the silica dehydrated at 600° C. was introduced. This was followed by the reintroduction of ethylene five minutes later. In both of the latter two cases, the polymerization reaction recovered to its original level, which demonstrates that the spray dried, slurry Ziegler-Natta catalyst upon full activation does not lose productivity when the free cocatalyst is removed by reaction with the silica dehydrated at 200° or 600° C. The silica dehydrated at 200° C. or 600° C. are henceforth referred to as 200° C. silica and 600° C. silica respectively indicating their dehydration temperatures.

Figure 3:
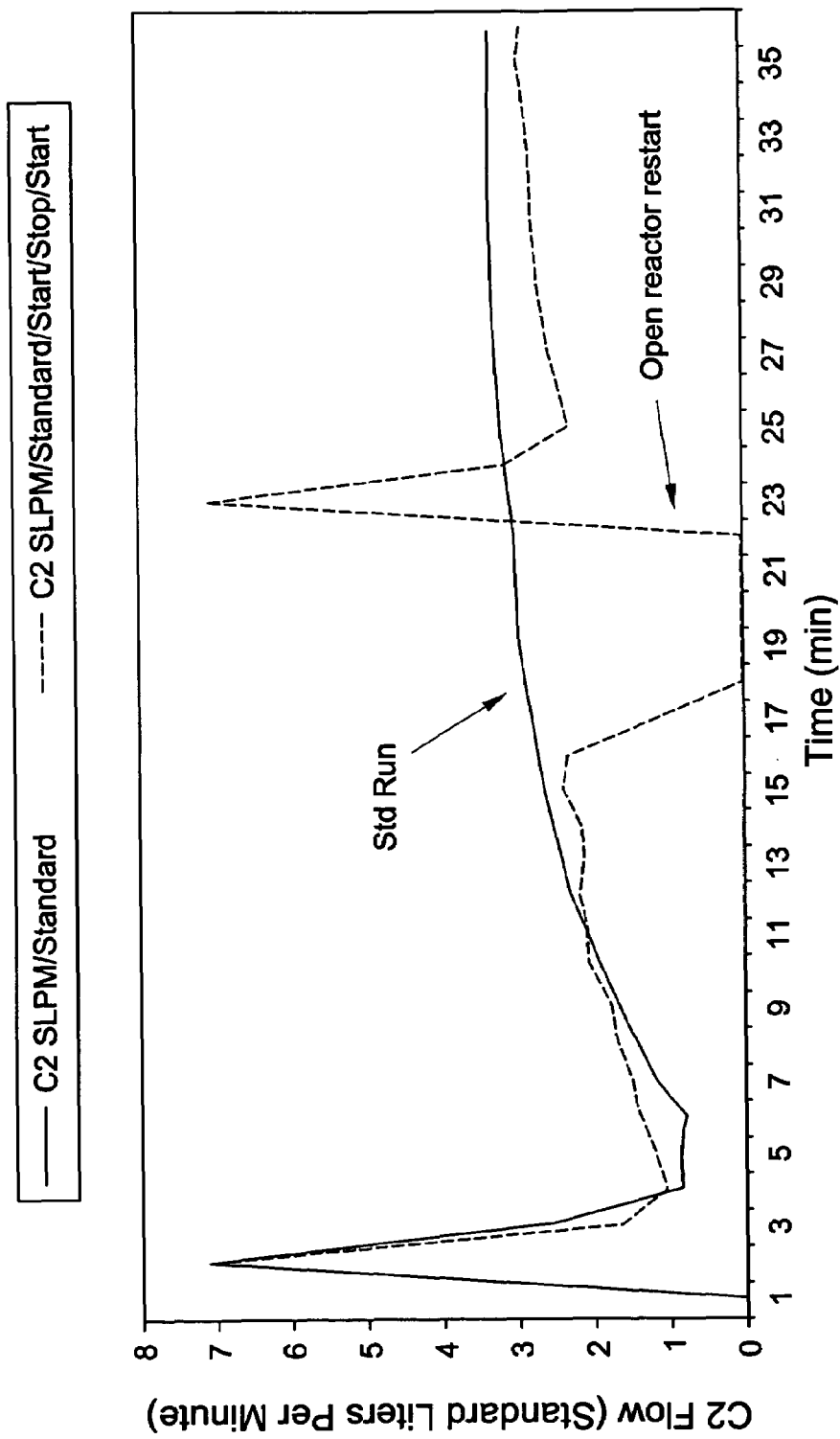
FIG. 3 is a plot of the ethylene uptake for a laboratory batch polymerization in hexane slurry using a dry-fed, particulate Ziegler-Natta catalyst at an 85° C. reaction temperature, 100 psi ethylene partial pressure and a 40:1 TEAL cocatalyst to titanium mole ratio for a first reference case of 30 minutes of polymerization, and a second reference case in which the ethylene feed was interrupted as discussed in more detail below.

FIG. 3 is a plot of the ethylene uptake for a laboratory batch polymerization in hexane slurry using a dry-fed, particulate Ziegler-Natta catalyst at an 85° C. reaction temperature, 100 psi ethylene partial pressure and a 40:1 TEAL cocatalyst to titanium mole ratio for a first reference case of 30 minutes of polymerization, and a second reference case in which the ethylene feed was interrupted and the ethylene removed via a vent from the reaction vessel after 16 minutes to stop the polymerization and in which after five additional minutes the ethylene feed and concentration were reestablished. The polymerization continued at approximately the same rate after ethylene was restored as before the vessel was vented.

Figure 4:
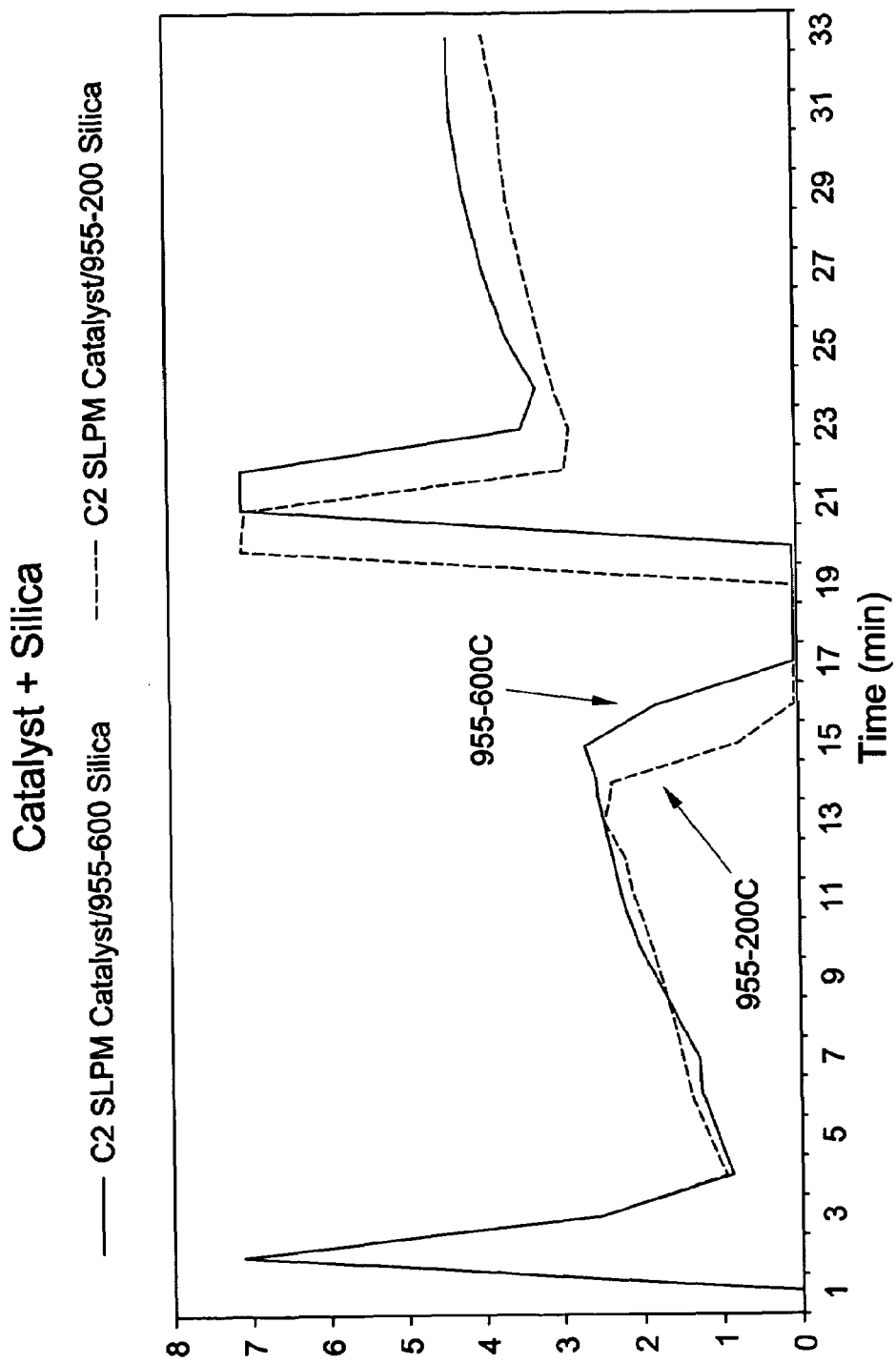
FIG. 4 is a plot of the ethylene uptake for a laboratory batch polymerization in hexane slurry using a dry-fed, particulate Ziegler-Natta catalyst at an 85° C. reaction temperature, 100 psi ethylene and a 40:1 TEAL to titanium mole ratio for two cases as discussed in more detail below.

FIG. 4 is a plot of the ethylene uptake for a laboratory batch polymerization in hexane slurry using a dry-fed, particulate Ziegler-Natta catalyst at an 85° C. reaction temperature, 100 psi ethylene and a 40:1 TEAL to titanium mole ratio for two cases, which demonstrates the effect of adding Grace Davison 955 silica dehydrated at either 200° or 600° C. The 200° C. silica was added to excess, greater than that stoichometrically required to react with all the TEAL and the 600° C. silica was added stoichometrically to the TEAL at a 0.6 mmole TEAL/g silica ratio. In both cases the ongoing polymerization reaction was interrupted by stopping the ethylene feed and removing the ethylene from the polymerization vessel by venting after 14 to 15 minutes. Silica dehydrated at 200° C. was introduced in one case and in the other case silica dehydrated at 600° C. was introduced. This was in both cases followed by the reintroduction of ethylene five minutes later. In both cases the polymerization reaction recovered to its original level, which demonstrates that the dry-fed particulate Ziegler-Natta catalyst upon full activation does not lose productivity when the free cocatalyst is removed by reaction with silica dehydrated at 200° or 600° C.

Figure 5:
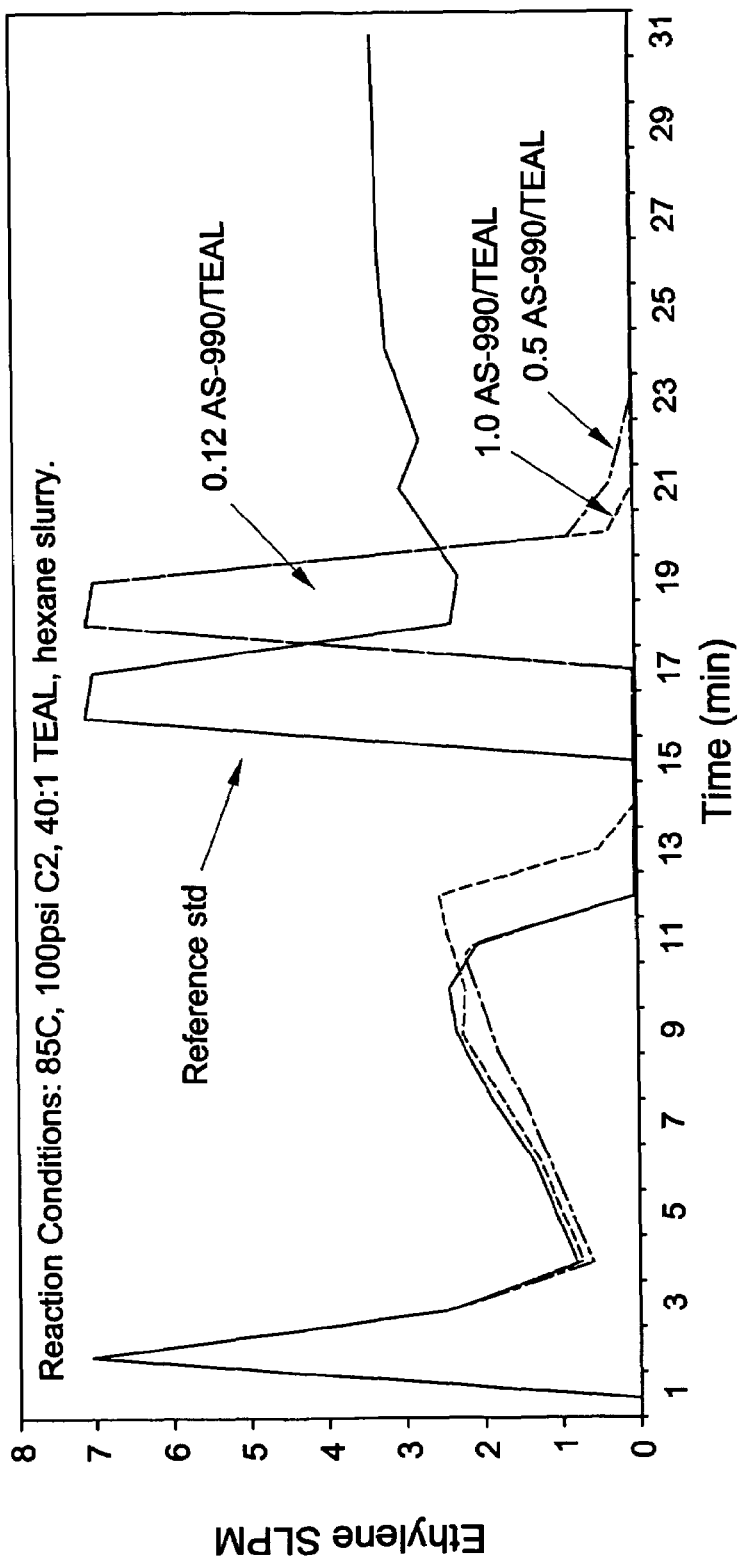
FIG. 5 is a plot of the ethylene uptake for a laboratory batch polymerization in hexane slurry using a dry-fed, particulate Ziegler-Natta catalyst at an 85° C. reaction temperature, 100 psi ethylene and a 40:1 TEAL cocatalyst to titanium mole ratio for four cases, which demonstrate the effect of adding various concentrations of Atmer™ AS-990 as discussed in more detail below.

FIG. 5 is a plot of the ethylene uptake for a laboratory batch polymerization in hexane slurry using a dry-fed, particulate Ziegler-Natta catalyst at an 85° C. reaction temperature, 100 psi ethylene and a 40:1 TEAL cocatalyst to titanium mole ratio for four cases, which demonstrate the effect of adding various concentrations of Atmer™ AS-990, a stearyl ethoxylated amine compound available from Ciba Specialty Chemicals. Included is a reference case using no AS-990. In all cases the ongoing polymerization reaction was interrupted by stopping the ethylene feed and removing the ethylene from the polymerization vessel by venting, prior to reintroducing ethylene five minutes later. The polymerization recovered fully in the reference case without the addition of AS-990, as well as for the case in which AS-990 was introduced at a concentration of 0.12 AS-990/TEAL mole ratio. The use of AS-990 at concentrations of 0.5 and 1.0 AS-990/TEAL mole ratio prevented continued polymerization when the ethylene was introduced. The AS-990 may inactivate the Ziegler-Natta catalyst system at levels of 0.5 AS-990/TEAL mole ratio and above by reacting with the cocatalyst and then also the catalyst itself, deactivating it permanently.

Figure 6:
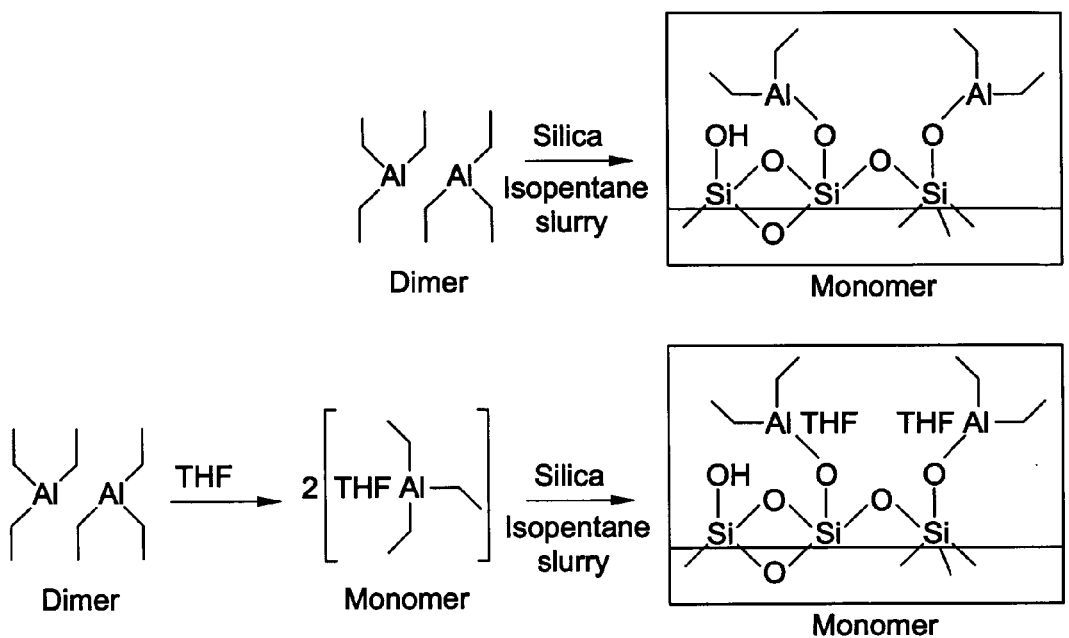
FIG. 6 shows the adsorption of triethyl aluminum, which exists as a dimer when neat or in aliphatic solution, onto a dehydrated silica.

FIG. 6 shows the adsorption of triethyl aluminum, which exists as a dimer when neat or in aliphatic solution, onto a dehydrated silica where the dimer is thought to be broken and to exist as a monomeric species after having reacted with the silanol groups on the silica surface. Tetrahydrofuran (THF) is a cyclic ether that is a component of dry and spray dried slurry Ziegler-Natta catalysts systems as described in U.S. Pat. Nos. 4,460,755, 5,290,745 and 4,293,673. THF inhibits the polymerization of chromium-based catalyst following the Ziegler-Natta to chromium catalyst transition. FIG. 6 shows that THF complexes with and breaks the TEAL dimer, and that the complex may then adsorb on the silica. The table included in FIG. 6 demonstrates that up to 15 to 16 wt % TEAL can be adsorbed onto silica dehydrated at 600° C. and 17 wt % can be adsorbed on silica dehydrated at 200° C. (regardless of whether the TEAL is added at a fast or slow rate). This was surprising given the significant difference in silanol content as a function of the silica dehydration temperature as is known in the art. Not to be bound by theory, but it was speculated that some of the TEAL adsorbed on the 600° C. silica was not bound to silanol, but rather attached as a secondary or tertiary layer on the chemically anchored TEAL, perhaps again as a dimer. A case in point was the Davison 955-600° C. TEAL on silica (TOS), which was the 955 silica dehydrated at 600° C. and pre-reacted with TEAL at a nominal loading of 5.8 wt %. This was approximately the amount of TEAL required stoichometrically to bind with the silanol concentration of a 600° C. dehydrated silica. Yet, the 5.8 wt % TOS adsorbed an additional 0.81 mmol TEAL per gram of silica when in hexane slurry. When the hexane was replaced with THF to form the slurry, the amount of aluminum adsorbed onto 600° C. silica decreased from the 1.30-1.39 mmol Al/g range to 0.75 mmol Al/g, corresponding to a loading of 8.6 wt % TEAL on the silica, which demonstrates that additional TEAL can be adsorbed onto 5.8 wt % TOS in the presence of excess THF.

FIG. 7 shows the effectiveness of Atmer™-163, a C13-C15 ethoxylated amine available from Ciba Specialty Chemical, in terminating an ongoing spray dried, slurry Ziegler-Natta catalyst in laboratory slurry ethylene polymerization reaction, wherein the polymerization was allowed to proceed for 20 minutes and various amounts of Atmer-163 were introduced on a molar basis ratioed to the amount of TEAL in the reactor. The polymerization reaction stopped at an Atmer-163 to TEAL mole ratio of 0.5.

Figure 8:
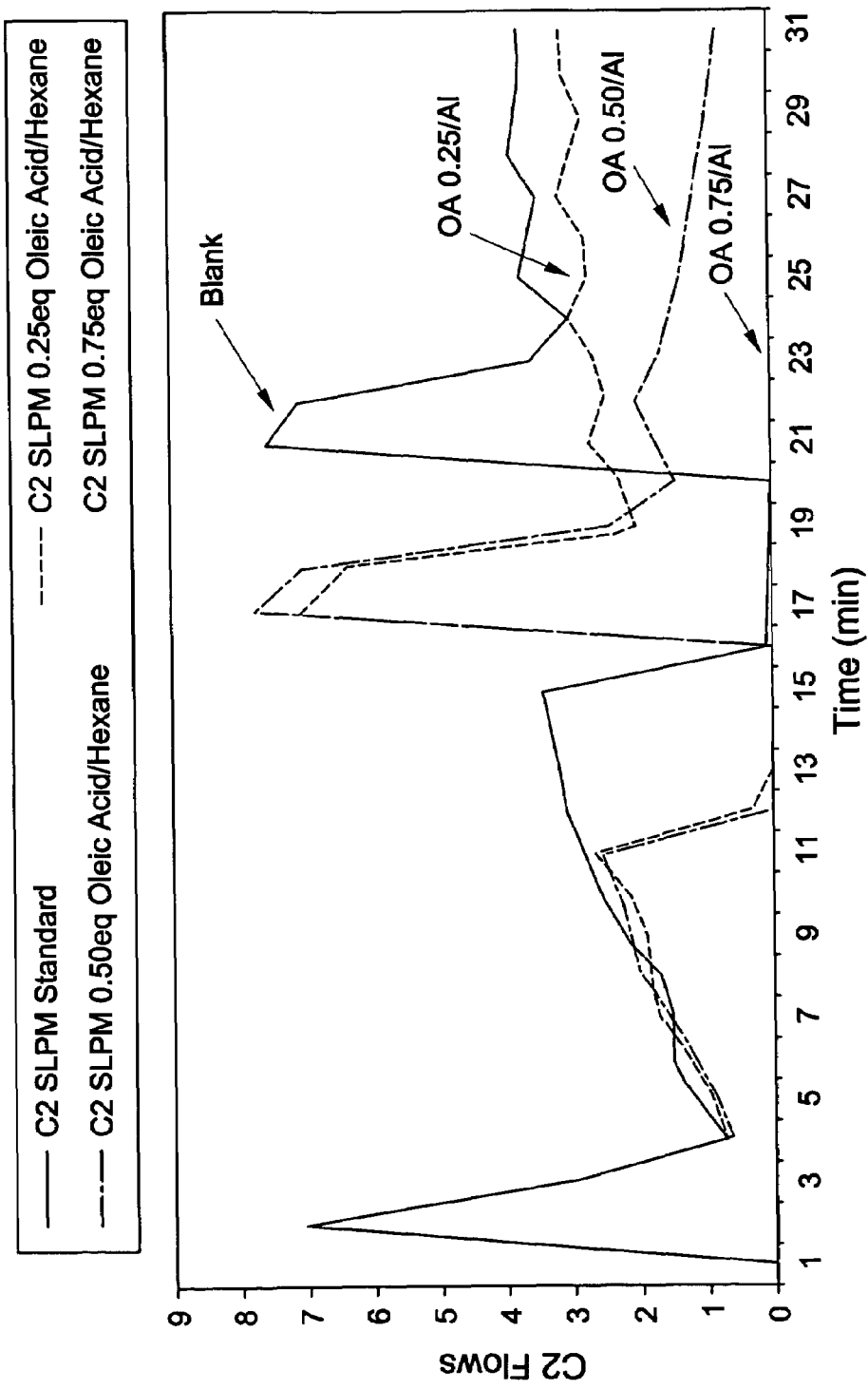
FIG. 8 is a plot of the ethylene uptake for a laboratory batch polymerization in hexane slurry using dry-fed, particulate Ziegler-Natta catalyst.

FIG. 8 is a plot of the ethylene uptake for a laboratory batch polymerization in hexane slurry using dry-fed, particulate Ziegler-Natta catalyst at an 85° C. reaction temperature, 100 psi ethylene partial pressure and a 40:1 TEAL to titanium mole ratio for four cases. They demonstrate the effectiveness of adding various concentrations of oleic acid for terminating an interrupted polymerization reaction. Included is a reference case using no oleic acid. The ongoing polymerization reaction was interrupted by stopping the ethylene feed and removing the ethylene from the polymerization vessel by venting. Ethylene was then reintroduced 5 minutes later. The polymerization recovered fully for the reference case, which had no oleic acid addition. The polymerization essentially recovered for the case in which oleic acid was added at a 0.25:1 mole ratio relative to the amount of TEAL present. A concentration of 0.5 oleic acid to TEAL mole ratio resulted in a 50% loss in catalyst polymerization activity in the first few minutes, which further diminished over time. The use of a 0.75 oleic acid to TEAL mole ratio resulted in the complete loss of catalyst polymerization reactivity.

Figure 9:
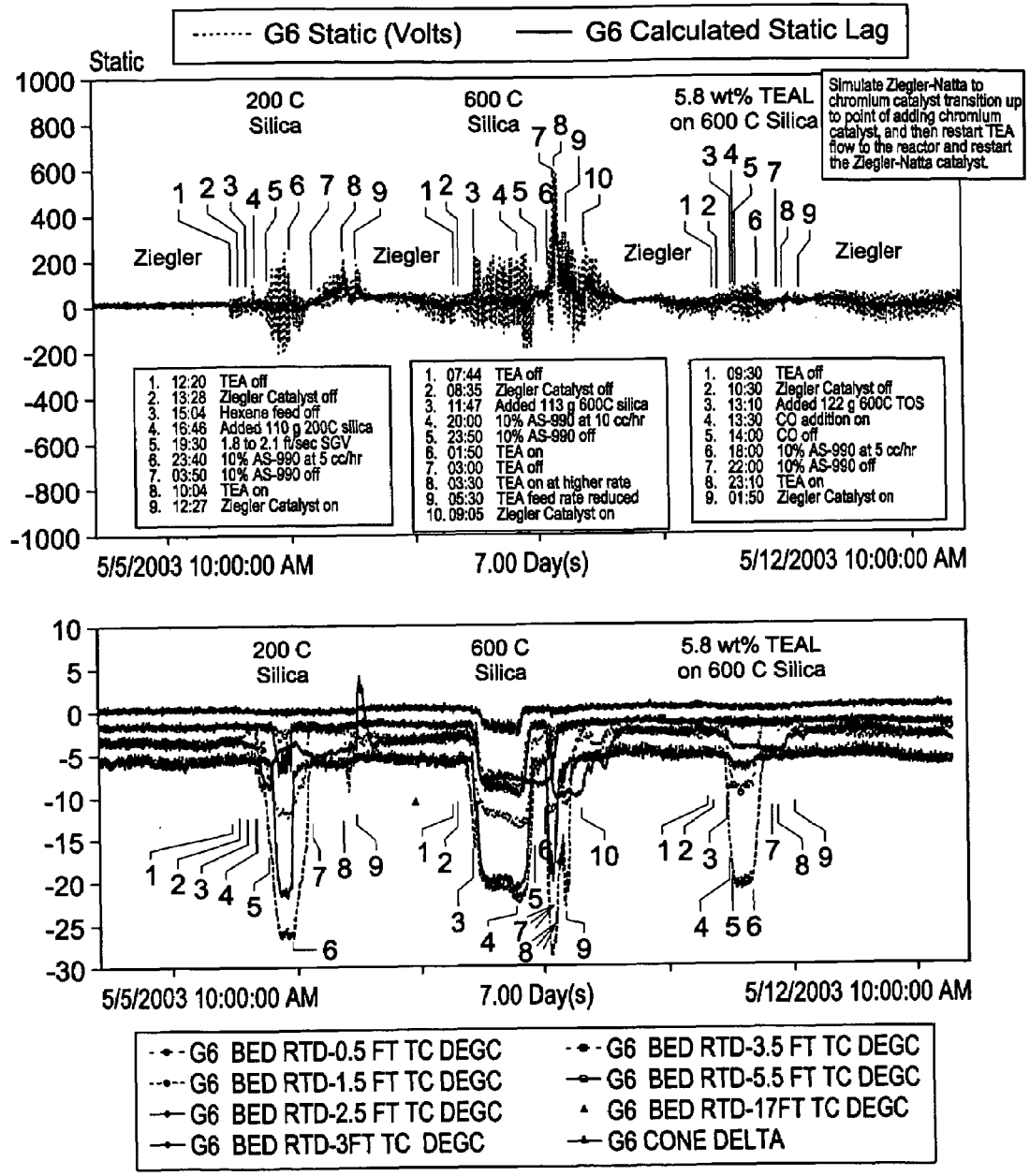
FIG. 9 shows that the silica treatment may affect the reactor static voltage and reactor wall skin thermocouple response during the Ziegler-Natta to chromium-based catalyst transition in a gas phase fluidized bed polymerization reaction system.
Figure 10:
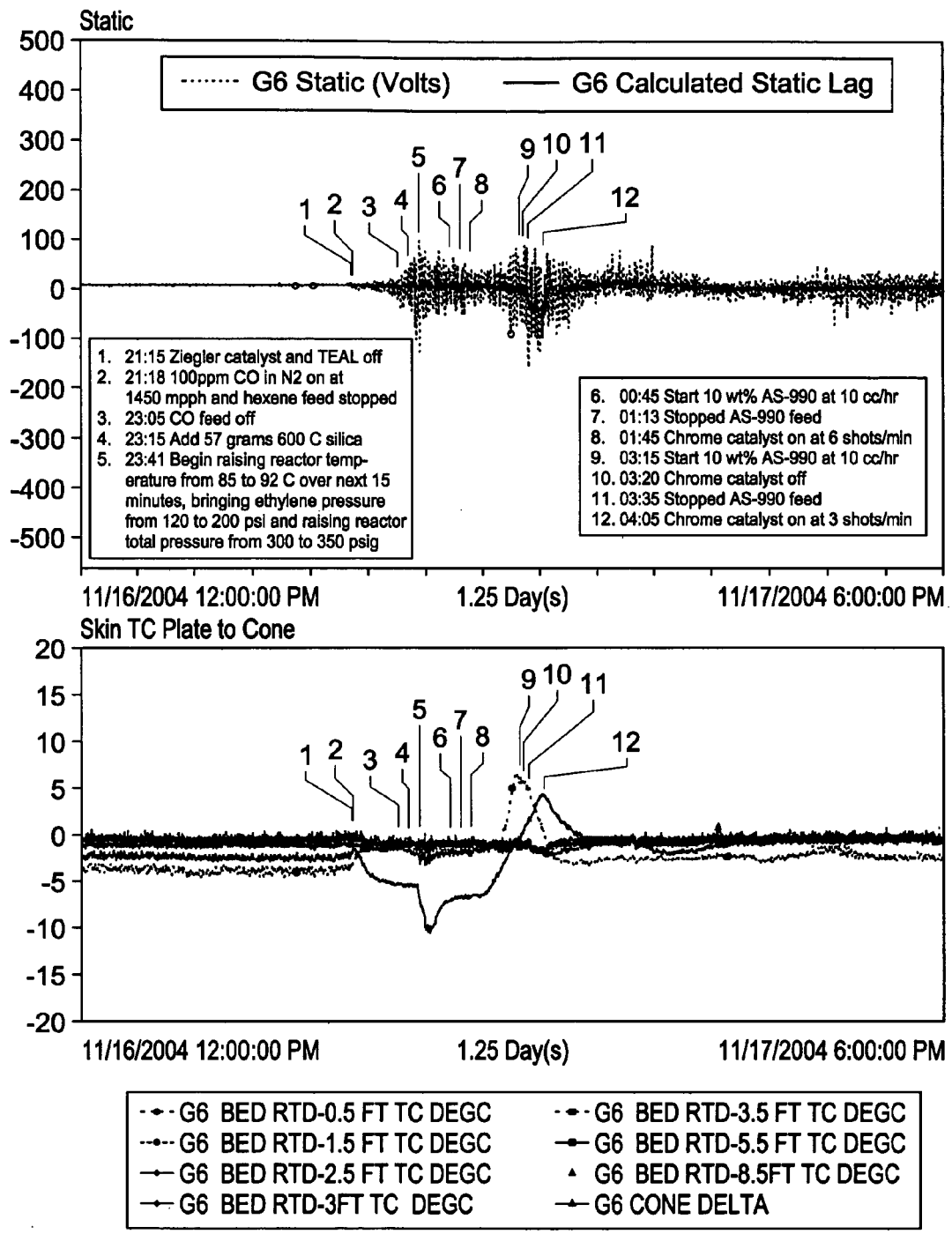

FIG. 9 shows that the silica treatment may affect the reactor static voltage and reactor wall skin thermocouple response during the Ziegler-Natta to chromium-based catalyst transition in a gas phase fluidized bed polymerization reaction system. The effects of Davison Grace 955 silica dehydrated at 200° C., 600° C. and 600° C. with treatment with triethylaluminum at a 5.8 wt % concentration were examined. The results are further discussed in the examples section. The triethylaluminum (TEAL) on 600° C. silica mitigated much of the static voltage activity measured in the bed. The magnitude of the skin thermocouple deviations from the bulk temperature of the fluid bed was also decreased with the TEAL on 600° C. silica. FIG. 9 further demonstrates that AS-990 addition can decrease the net amount of static voltage in the fluid bed to neutral, and can also reduce the magnitude of the static voltage variation, both positive and negative. AS-990 also caused the wall skin thermocouple cold-bands, the term referring to the depression relative to the average bed temperature, to return to the normal or near-normal values that existed prior to the simulated transition and in particular to the levels much decreased relative to those induced by the silicas' addition.

Figure 12:
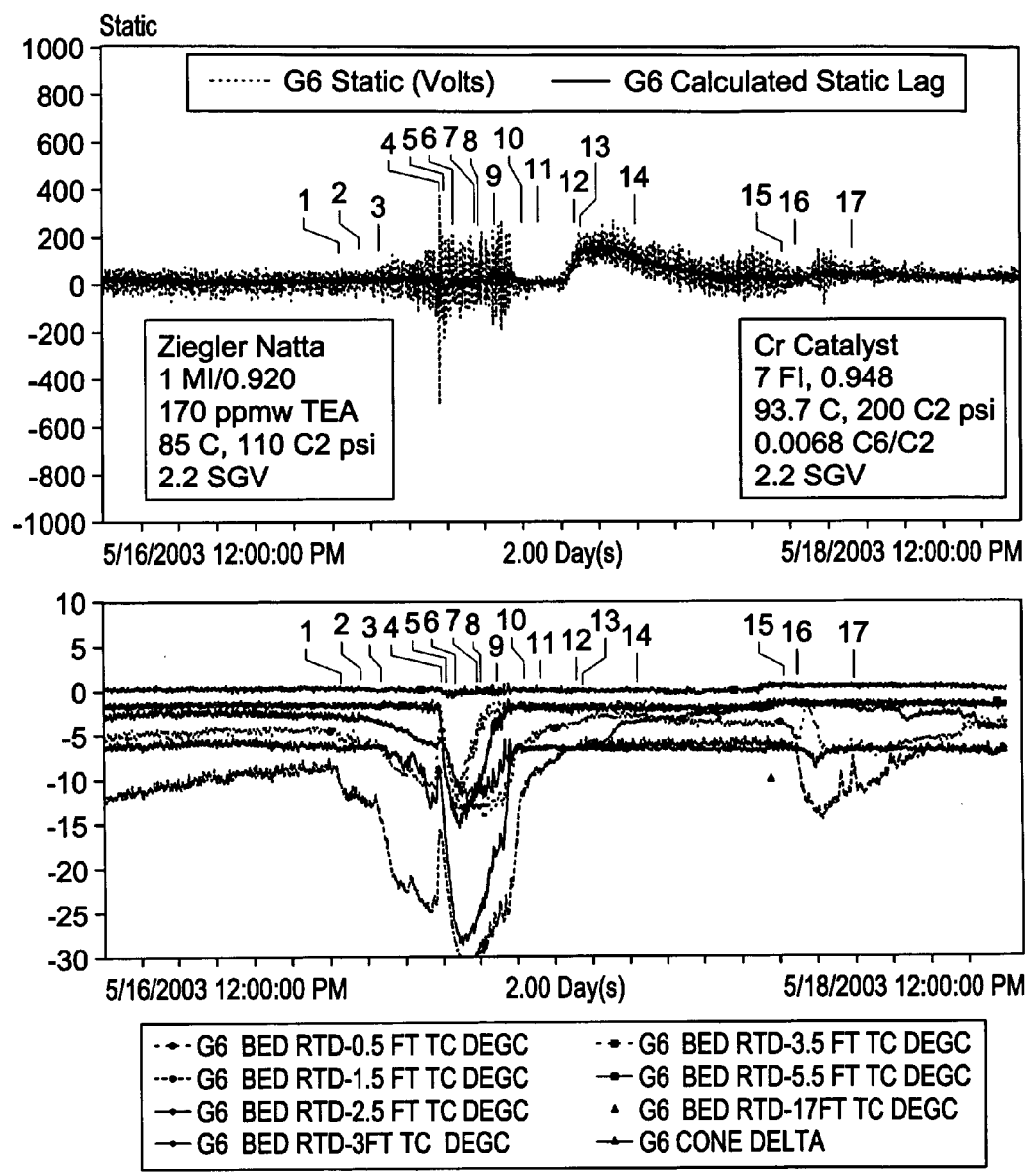
Figure 13:
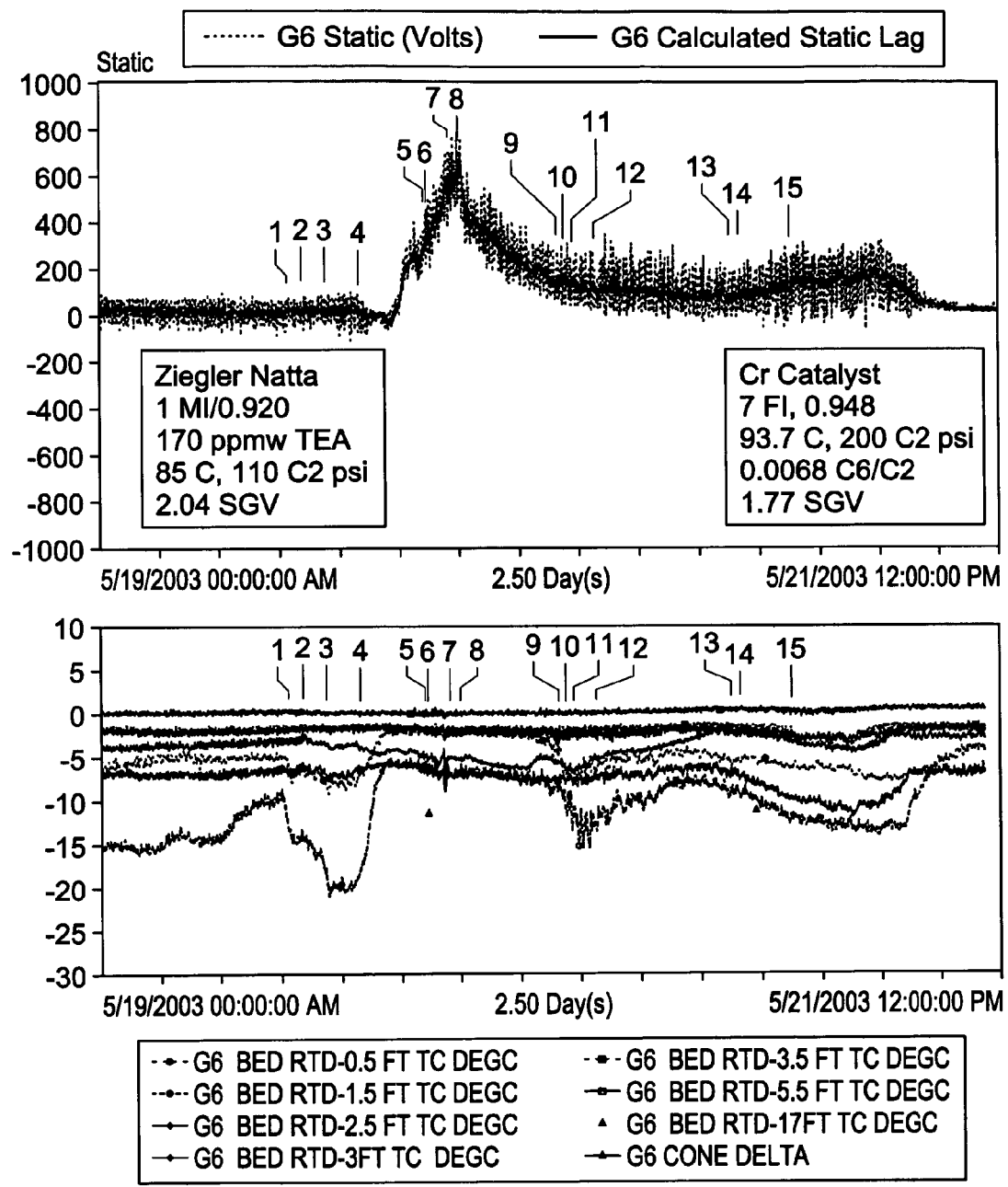

FIGS. 10 through 13 show annotated reactor static voltage probe and reactor wall skin thermocouple responses for non-optimized pilot-scale transitions from Ziegler-Natta to chromium-based catalysts using methods and procedures discussed briefly here and in greater detail in the examples section. The addition of carbon monoxide to the Ziegler-Natta catalyst at the start of the transition shown in FIG. 10 was a particularly useful method to ameliorate deleterious static and skin thermocouple responses during the subsequent silica addition. FIG. 11 demonstrates the utility of AS-990 in mitigating static and skin thermocouple cold-bands. FIG. 12 demonstrates the use of TEAL on silica as a cocatalyst adsorbent. FIG. 13 shows a transition using AS-990 and not silica as the cocatalyst adsorbent.

FIG. A demonstrates the effect of Oleic acid and triethyl aluminum on chromate ester based catalyst, with varying levels of oleic acid.

Embodiments of the present invention relate to processes for transitioning between catalysts and/or catalyst systems to convert a reactor from producing one type of product to another, with minimal down time, including transitioning between Ziegler-Natta catalysts and chromium-based catalysts. Catalysts and catalyst systems will be used interchangeably herein. Generally, catalyst systems will include the catalyst itself, an optional cocatalyst and/or an optional support.

The processes of the present invention are one of gas, solution, slurry or bulk phase polymerization processes including gas phase polymerization process in a fluidized bed reactor.

In a typical continuous gas phase fluidized bed polymerization process for the production of a polymer from monomers, a gaseous stream comprising monomer is passed through a fluidized bed reactor in the presence of a catalyst under reactive conditions. A polymer product is withdrawn from the fluidized bed reactor. Also withdrawn from the reactor is a cycle gas stream, which is continuously circulated and usually cooled. The cycle gas stream is returned to the reactor together with additional monomer sufficient to replace the monomer consumed in the polymerization process. For detailed description of gas phase fluidized bed polymerization processes see U.S. Pat. Nos. 4,543,399; 4,588,790; 5,028,670; 5,352,769 and 5,405,922.

For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, or 2-15 carbon atoms, for example ethylene, propylene, butene-1, pentene-1, 4-methylpentene-1, hexene-1, octene-1, decene-1 and cyclic olefins such as styrene. Other monomers can include polar vinyl, diene, norbornene, acetylene and aldehyde monomers. Other embodiments of the present invention include, the gas composition contains ethylene and at least one alpha-olefin having 3 to 15 carbon atoms, including butene-1, hexene-1 or octene-1.

Typically, the gas composition also contains an amount of hydrogen to control the melt index of the polymer to be produced. In typical circumstances the gas also contains an amount of a dew point increasing component (known as Induced Condensing Agent (ICA)) or components with the balance of the gas composition made up of non-condensable inerts, for example, nitrogen.

Depending on the second catalyst to be introduced into the reactor during a transition, the gas concentrations of the various components of the gas composition can be altered during the course of the transition, for instance, the comonomer and hydrogen gas concentrations can be increased or decreased.

Transitioning between catalysts can result in amounts of off-grade polymers. For example, residual traces of Ziegler-Natta catalysts in a chromium-based system can result in high molecular weight polymer gels that adversely affect the appearance of films made with the polymer. In addition, the transition can also result in the production of high levels of small polymer particles less than 10 microns that are referred to as "fines." Fines can induce operability problems in the reactor leading to fouling of portions of the polymerization system or sheeting incidents, whereby a mass of polymer aggregates, overheats, melts and fuses along the reactor wall forming a body having a relatively flat appearance.

The processes of embodiments of the invention are generally applicable to transitioning from a Ziegler-Natta catalyst system to a chromium-based catalyst system. According such embodiments, in a steady state operation with a Ziegler-Natta catalyst, the first polymerization reaction is halted by first discontinuing the introduction to the reactor of the Ziegler-Natta catalyst, followed by introducing and dispersing at least one cocatalyst adsorbing material. Cocatalyst adsorbing materials may comprise inorganic oxides similar to those used as catalyst supports, but differentiable from such catalyst supports found in reactors in that transition metals used in catalyst preparation will be substantially absent from such cocatalyst adsorbing agents. By substantially absent, we intend less than 5%, or less than 3%, or less than 1%, or less than 0.5%, or less than 0.01%, or zero, or none intentionally added, based on the total weight of the inorganic oxide cocatalyst adsorbing agent. Included is dehydrated silica, which may be added in the range of 100 to 10,000 ppmw on a resin basis to the fluid bed reactor, or 500 to 4000 ppmw on a resin basis. Other non-limiting examples of inorganic oxides include alumina and mixed alumina and silica compounds.

In one embodiment, the polymerization reaction is conducted by the essentially continuous passage of monomer gases through the polymerization zone of a gas phase fluidized bed reactor which contains a fluidized bed of polymer particles.

In another embodiment, a transition aid agent is also introduced into the reactor to aid in reducing or eliminating static electricity build up, temperature gradients, bed height fluctuations, and/or other instabilities that may be encountered when transitioning from one catalyst system to another.

Among the transition aid agents (TAA) useful in the practice of embodiments of the invention are alkoxylated amines and alkoxylated amides among which is ethoxylated stearyl amine, available commercially from the Ciba Specialty Chemicals as Atmer® AS-990 either neat or as a free flowing powder containing silica. In the practice of embodiments of the invention, the transition aid agent may be added to the reactor, either to the fluid bed directly or to the free-board above the fluid bed or to the cycle gas recirculation line before or after the cycle gas compressor or cooler. The sequence in which the transition aid agent is added is such that it is effective in improving reactor performance during and after the transition. In one embodiment, the transition aid agent is added prior to stopping the Ziegler-Natta catalyst feed, either before or after decreasing or stopping the cocatalyst feed. In another embodiment, the transition aid agent is added after stopping the catalyst feed and, if it is not already turned off, before the cocatalyst feed is stopped. In another embodiment, the transition aid agent is added after stopping the catalyst and after stopping the cocatalyst feed but before the cocatalyst adsorbing material is added. In another embodiment, the transition aid agent is added before or after the addition of a deactivating agent. In another embodiment, the transition aid agent is added simultaneously with the start of or during the addition of the cocatalyst adsorbing material. In another embodiment, the transition aid agent is added after the addition of the cocatalyst adsorbing material. In another embodiment, the transition aid agent is added after the start of the chromium catalyst feed to the reactor. It is within the scope of the invention that multiple aliquots of transition aid agent be added at different times in the sequence of transition events, such as, for purposes of illustration: after the addition of the deactivating agent but before the addition of the cocatalyst adsorbing agent for the first aliquot; and then for a second aliquot after the addition of the cocatalyst adsorbing agent; and even for a third aliquot during the early operation on the chromium-based catalyst. Such additional aliquots may be added either in a predetermined schedule or in response to atypical deviations of the reactor static voltage probe measurements or reactor wall skin thermocouples. Single or multiple aliquots may be added essentially all at once or added over a selected period of time at a controlled feed rate. The transition aid agents may be added as a solid, liquid, solution or slurry, such as for example in mineral oil, and may or may not include the as received silica flow aid contained in the free flowing Atmer AS-990. For an embodiment where ethoxylated stearyl amine is the transition aid agent, a typical amount added to aid the transition is from 5 to 2000 ppmw on a resin basis, or from 10 to 500 ppmw. It is within the scope of embodiments of this invention to use mixtures of the transition aid agents, non-limiting examples of which include mixtures of alkoxylated amines and alkoxylated amides, and mixtures of alkoxylated amines with varying fatty acid length, such as a mix of Atmer AS-990 and Atmer-163, having C-18 and C-13/C-15 fatty acid chain lengths respectively.

In still another embodiment, some or all the transition aid agent may be preadsorbed, deposited or impregnated onto the cocatalyst adsorbing material prior to adding it to the reactor, or may be premixed with and cofed with the cocatalyst adsorbing agent to the reactor. This simplifies the transition procedure by reducing the number of steps and has the added benefit that the static electrification of the catalyst adsorbing material is greatly reduced during transfer and handling as well as greatly reducing the static voltage charging of the bed and the magnitude of the decrease in reactor wall skin thermocouples as the cocatalyst adsorbing material is added and circulated in the polymerization system. The amount of, for example, stearyl ethoxylated amine mixed with or adsorbed on the cocatalyst adsorbing materials can be in the range of 0.05 to 20 wt %, or 0.1 to 5 wt % based on the total weight of cocatalyst adsorbing material and TAA. The AS-990 stearyl ethoxylated amine reacts with the cocatalyst in the Ziegler-Natta system, non-limiting examples of which include triethylaluminum (TEAL), trimethylaluminum (TMA), diethylaluminum chloride (DEAC) and triisobutylaluminum (TiBA). Resulting adducts from the reaction may include the following: a 1:1 stoichiometry with the ternary aluminum alkyl losing two alkyl groups and bonding with each of the ethoxylated amines of the AS-990. Alternatively, in the presence of excess AS-990, two AS-990 molecules may combine with each aluminum alkyl for a possible 2:1 stoichiometry. In the presence of excess aluminum alkyl, the reaction may favor a 1:2 stoichiometry with two aluminum alkyls per each AS-990. The actual adducts formed may depend on mixing conditions and local concentration gradients, but it appears that at least a minimum of a 1:2 amine or amide to aluminum alkyl molar ratio is needed to render the aluminum alkyl ineffective for continued polymerization.

In one embodiment using the transition aid agent, the transition aid agent takes the place of and serves the function of the cocatalyst adsorbing material in a dual purpose capacity. In such a case, the amount of transition aid agent is increased to an effective amount sufficient to react with the cocatalyst, being added to the reactor to a concentration that achieves a 0.1:1 to 10:1 molar ratio with the active metal in the cocatalyst, or a 0.5:1 to 3:1 molar ratio. This embodiment has the benefit of avoiding the static voltage electrification of the bed and reactor wall skin thermocouple depressions associated with the use of silica cocatalyst adsorbing material. Furthermore, the quantity of cocatalyst adsorbing material transition aid agent in dual purpose capacity remaining after reacting with the Ziegler-Natta cocatalyst or the reaction product adduct thereof, is at such a low concentration as to not impede the subsequent chromium-based polymerization catalyst, with the caveat that the loss in initial chromium catalyst polymerization reactivity is less than 90%, or less than 50%, or than 20% or less than 10%, or zero.

In another embodiment, the transition aid agent is used without a deactivating agent as it may itself at least partially deactivate the Ziegler-Natta catalyst. In another embodiment, the transition aid agent is used without deactivating agent and without cocatalyst adsorbing material.

Another transition aid agent is oleic acid, also known as cis-9-octadecenoic acid, which may be used in addition to dehydrated silica or the amine- or amide-type agents, or by itself to scavenge the cocatalyst from the Ziegler-Natta polymerization. Possible products from the reaction with aluminum alkyls are herein summarized, and it is recognized that compounds such as and not limited to aluminum oleate and also aluminum dioleate may be formed, which may have a further ameliorating effect on the polymerization process to prevent resin agglomeration or sheeting of any remaining Ziegler-Natta catalyst activity and the subsequent chromium catalyst polymerization. In one embodiment, the oleic acid is used without a deactivating agent as it may itself at least partially deactivate the Ziegler-Natta catalyst. In another embodiment, oleic acid is used without a cocatalyst adsorbing material as it may itself adsorb the cocatalyst. In another embodiment, the oleic acid is used without deactivating agent and without cocatalyst adsorbing material.

In yet another embodiment of the invention, a deactivating agent may be introduced into the reaction along with the cocatalyst adsorbing agent. The deactivating agents useful in the practice of the invention are oxygen-containing compounds that are gaseous under standard conditions and hydrogen-containing compounds, which are liquid or solid under standard conditions. The oxygen-containing compounds include oxygen, carbon monoxide, carbon dioxide, nitrogen monoxide, air, sulfur dioxide carbonyl sulfide and nitrogen dioxide. The active hydrogen-containing compounds include water, alcohols, phenols, carboxylic acids, sulfonic acids, primary amines such as ethylamine, isopropylamine, cyclohexylamine and aniline, and secondary amines such as dimethylamine, di-n-butylamine, di-benzylamine and piperidine. Also included is ammonia. In an embodiment, carbon monoxide is the deactivating agent and is introduced into the reactor at 0.02 to 10 ppmv, or 0.1 to 8 ppmv or 0.4 to 5 ppmv, which is sufficient to effect catalyst deactivation without introducing great excess of the deactivating agent that may have to be later removed from the reaction system by venting and purging.

In the practice of the invention, the deactivating agent may be introduced prior to or essentially simultaneous with stopping the catalyst feed, or just after stopping the catalyst or cocatalyst addition, with the benefit that the ongoing polymerization is terminated without time spent waiting for the resin production rate to diminish due to normal system process. The deactivating agent may be added continuously to the reactor during Ziegler-Natta polymerization prior to starting the transition, as some or all of these agents have the ability to improve the performance and operability of the polymerization reactor when added at concentrations less than that required to effect a complete catalyst deactivation. The concentration of the deactivating agent in the cycle gas can be increased stepwise over time to affect the complete kill or deactivation of the catalyst, ranging from zero to 6 hours, with the benefit of improving reactor operation during and after the transition. In one embodiment, the deactivating agent is added all at once in sufficient amount to terminate the polymerization and any subsequent changes in the reactor static voltage or reactor wall skin thermocouples are essentially inconsequential as the polymerization has ceased. Combinations of deactivating agents or simultaneous or sequential use of one agent and then another are contemplated by this invention.

The addition of the deactivating agent, as observed for carbon monoxide in the transition from Ziegler-Natta to chromium-based catalyst systems, has the unexpected and unanticipated surprising benefit of improving and ameliorating the operation of the reactor during and after feeding the cocatalyst adsorbing material and after starting polymerization with the new catalyst. In the absence of the deactivating agent, the addition of the cocatalyst adsorbing material, for example dehydrated silica, evokes an increased reactor static voltage measurement and a decrease of the reactor wall skin thermocouples referred to as cold-banding as the particulate polymer is drawn to the reactor walls forming insulating layers. These insulating layers can lead to the eventual formation of fused resin agglomerates often referred to as sheets or sheeting, formed prior to or after the introduction of the new catalyst. Not to be bound by theory, sheets formed prior to introduction of the new catalyst have the root cause of their formation in the residual polymerization reactivity of the Ziegler-Natta catalyst even though the cocatalyst adsorbing material consumes the residual cocatalyst in the polymerization system and may have hitherto been considered sufficient to terminate the catalyst's reactivity. Sheets formed after the introduction of the new catalyst, the chromium-based catalyst, would likely have their basis in disturbances registered by the reactor static voltage measurement and deviations in the reactor wall skin thermocouple measurements including those in the expanded section of the reactor above the fluidized bed. Surprisingly and unexpectedly, these static voltage problems, skin thermocouple deviation and sheeting problems are ameliorated by the use of the deactivating agent, which improves the performance of the reactor system and also provides for good control of the height of the fluid bed reactor at or near, the junction of the straight side cylindrical reactor wall with the transition to the inverted truncated cone of the expanded section. This benefit of the deactivating agent was less than obvious as the scavenging of the cocatalyst with the cocatalyst adsorbing agent had prior to this invention been expected to have stopped most if not all of the residual Ziegler-Natta polymerization reaction remaining after stopping the catalyst feed and after allowing the polymer production rate to diminish over time. Moreover, it would seem counter intuitive to one skilled in the art to introduce a seemingly unnecessary deactivating agent as that agent may have to be later purged from the reactor system in order to initiate and sustain polymerization upon transition to chromium-based catalyst. Yet, in the process of changing the reactor cycle gas compositions in the later steps of the transition procedure as required by the different catalyst systems, it is relatively facile without great or significant time penalty to purge the cycle gas of the deactivating agent to an acceptable level.

In an embodiment, the deactivating agent is added to the reactor system prior to the introduction of the cocatalyst adsorbing material. Not to be bound by theory, this insures that the residual Ziegler-Natta productivity is terminated, and may so avoid the formation of small agglomerates at the reactor wall that intensify and exacerbate static voltage measurements, which lead to more agglomerates and more static voltage generation. There may be other explanations that are as yet not elucidated. There is also the benefit that this deactivating agent would reduce the chance of continued Ziegler-Natta reaction or incidence of high molecular weight gel contamination by low-grade polymerization reaction in the absence of or low level of cocatalyst. The deactivating agent may be added at a predetermined concentration or in increasing increments.

In another embodiment, the deactivating agent is added to the reactor system simultaneous with or after the introduction of the cocatalyst adsorbing material either at a predetermined concentration or in increasing increments in response to improvements or changes in the reactor static voltage or measurement of reactor wall skin thermocouples.

In the practice of the invention, the deactivating agent may need to be purged from the reactor system in order to initiate and sustain the subsequent chromium-based catalyst polymerization. Yet, not all the agent need be removed in order to do so, only to an acceptable concentration that is easily determined by one skilled in the art and based somewhat on experience. There may be additional benefit of some remaining deactivating agent as it may temper the polymerization kinetics, reduce the initial productivity and aid the operability of the chromium-based catalyst as the transition is completed. Lingering effects of the deactivating agent may also suppress and diminish reactivation of the Ziegler-Natta catalyst, which could otherwise result in gels. It is contemplated by the inventors for this reason to continue to feed a low level of the deactivating agent or agents continuously or for a period of time after starting the chromium-based catalyst, and that this feed could continue for several bed turnovers. As a case in point, it is common practice to employ the use of oxygen addition continuously at low levels during the gas phase polymerization of chromium-based catalyst systems to effect changes in the polymer molecular weight and comonomer incorporation. This may have an ameliorating effect on reactor operability, and in the case of oxygen, the addition is typically started a short time, for example within 10 minutes to 5 hours, after starting the chromium-based catalyst, as the resin production rate increases. Alternatively, the oxygen feed may be started prior to starting or simultaneous with starting the chromium-based catalyst. The other deactivating agents, that include but are not limited to carbon dioxide, water, air, ammonia and oleic acid, may also be employed for continuous use with the chromium-based catalyst post transition in similar fashion as that of oxygen. They may be used alone or in concert in combinations, such as water and oxygen addition together during continuous chromium oxide catalyst or chromate ester catalyst polymerization, with water in the range of from 10 to 10,000 ppbv and oxygen in the range of from 10 to 400 ppbv. Oxygen addition levels for continuous chromium catalyst operation are in the range of from 10 to 1000 ppbv in the cycle gas (based on the total gas volume in the reactor) or on an ethylene feed basis, more typically in the range of from 10 to 400 ppbv.

In one embodiment to avoid or minimize purging to remove the deactivating agent from the polymerization system prior to starting the second catalyst, the amount of deactivating agent is added to the reactor to a concentration that just deactivates the remaining Ziegler-Natta catalyst, such that the amount of excess deactivating agent is less than 10% of that required to effect the termination of polymerization of the Ziegler-Natta catalyst, or less than 5% or less than 1%, which allows the chromium-based catalyst to initiate polymerization with relative ease with the understanding that the catalyst itself may in some cases scavenge the remaining deactivating agent through reaction. In the practice of the invention, the residual Ziegler-Natta polymerization rate may be monitored by temperature, ethylene feed, heat balance or other methods and the deactivating agent added in repeated small aliquots or continuously until the polymerization reaction is terminated. In yet another embodiment, the deactivating agent is more effective for the Ziegler-Natta catalyst such that the concentration required to terminate the first catalyst's reactivity has little or much reduced effect on the chromium-based catalyst so that little or no purging is required to remove the deactivating agent. Many of the chromium-based catalysts are relatively insensitive to deactivation and productivity loss by carbon dioxide, which is an example of such an agent.

The amount of deactivating agent added to the cycle gas is sufficient to diminish the productivity of the Ziegler-Natta catalyst by at least 10% and need not result in a total loss of productivity in order to achieve the benefit of embodiments of this invention. When using carbon monoxide, the concentration in the cycle gas may range from 0.02 to 10 ppmv, or 0.1 to 8 ppmv or 0.4 to 5 ppmv. The approximate concentrations for the deactivating agents carbon dioxide, water, oxygen, air and ammonia may range from 0.02 to 40 ppmv, 0.02 to 10 ppmv, 0.01 to 5 ppmv, 0.1 to 100 ppmv and 0.02 to 40 ppmv respectively. These concentrations are based on the amount of agent added to the reactor relative to the quantity of gas in the reaction system and are not that measured in the cycle gas, as these agents exhibit reactivity with the cocatalyst. Even after the cocatalyst is adsorbed by the cocatalyst adsorbing material, the cocatalyst may react with the deactivating agent so that only a portion of the deactivating agent remains in the cycle gas. The deactivating agents may be added all at once, stepwise, or steadily over a period of time. In another embodiment, the deactivating agent is added as the Ziegler-Natta catalyst and cocatalyst feeds are discontinued. In another embodiment, the deactivating agent is added as the catalyst feed is discontinued, and the cocatalyst addition continues for a time ranging from 1 minute to 5 hours, either at the same or a reduced rate. In another embodiment, the Ziegler-Natta catalyst feed is stopped, and the cocatalyst addition continues at the same or a reduced or gradually reduced rate for a time ranging from 1 minute to 5 hours, during or after which the deactivating agent is added in either small aliquots or at a low rate that gradually causes the termination of the polymerization reaction, as it is added over a time period ranging from 1 minute to 5 hours or in a quantity sufficient to deactivate the catalyst all at once.

The transition aid agent may exhibit antistatic properties. Compounds that exhibit such properties are known in the art and may be applied to polymerization processes and used in concert with the elements of this invention. Such transition aid agents may be either adsorbed on the silica used to scavenge the cocatalyst or fed as an additive to the reactor at a convenient stage of the transition to reduce the reactor static voltage or to reduce the fouling and adhesion of resin to the reactor walls or other points in the system. Non-limiting examples of possible fouling locations in a fluidized bed reactor include the distributor plate, cycle gas cooler, cycle gas line, bottom head below the plate including the gas distributions system, and the expanded section above the fluid bed, whether the sloped side, the straight side or the top dome. Such transition aid agents may be added continuously or in single or multiple aliquots, and their use may be as combinations with other such transition aid agents and may continue into operation on the chromium-based catalyst. A non-limiting list of such compounds is herein tabulated in which R is a saturated or unsaturated hydrocarbon radical having 12 to 22 carbon atoms, M is an alkali or alkaline earth metal, m and n are a number from 1 to 10, and X represents halogen atom.

(1) Higher fatty acid soap (RCOOM),
(2) Salts of sulfuric acid esters of higher alcohols represented by the general formula $ROSO_3M$,
(3) Salts of sulfuric acid esters of higher secondary alcohols represented by the general formula

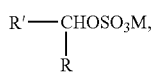

where R and R' may be the same or different,
(4) Alkali or alkaline earth metal salts of the reaction products of castor oil, olive oil, peanut oil, or cottonseed oil and sulfuric acid,
(5) Alkali or alkaline earth metal salts of d esters of polyhydric alcohols with higher fatty acids and sulfuric acid,
(6) Salts of sulfuric acid esters of higher fatty acid alkylolamides represented by the general formula $RCONH-(CH_2)_n-OSO_3M$,
(7) $R-(OCH_2CH_2)_n-OSO_3M$,
(8) Salts of (higher alkyl) sulfonic acids, $RSO_3M$,
(9) Salts of alkylarylsulfonic acids,
(10) Condensation products of R—COCl and the compounds,

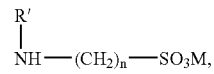

(11) Condensation products of R—COCl and the compounds, $HO-(CH_2)_n-SO_3M$,
(12) Alkali or alkaline earth metal salts of dialkylsulfosuccinic acids,
(13) Alkali or alkaline earth metal salts of partial esters of higher alcohols with phosphoric acid,
(14) Salts of primary amines, $[R-NH_3]^+A^-$, wherein A is chlorine, bromine or other halogen atoms, or

(15) Quaternary ammonium salts,

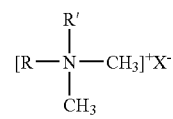

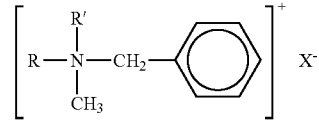
(16)

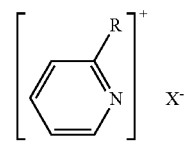
(17)

(18) Alkylglycine type compounds,

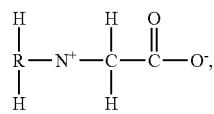

(19) Compounds,

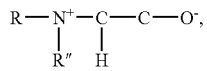

(20) Compounds of the imidazoline type,
(21) Compounds of the alkylaminesulfonic acid type,

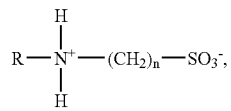

(22) Polyoxyethylene alkyl ethers, R—O(CH$_2$CH$_2$O)$_{n-1}$CH$_2$CH$_2$OH,
(23) Addition products of alkylphenols and polymerized ethylene oxide,
(24) Esters of polyethyleneglycols with higher fatty acids,
(25) Compounds,

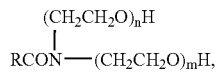

(26) Compounds,

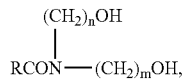

(27) Polyoxyethylenealkylamines,

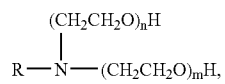

(28) Alkylmercaptan ethers, R—S—(CH$_2$CH$_2$O)$_n$H,
(29) Glycerol higher fatty acid esters,
(30) Sorbitan higher fatty acid esters,
(31) Commercial antistatic agents for petrochemical fuel oil, such as Stadis® 450 supplied by DuPont,
(32) Reaction product of polyethyleneimine laurate, phytic acid, and dioctyl sulfonsuccinate Na salt,
(33) A polysulphone and (A) a quaternary ammonium compound or (B) a polymeric polyamine. The quaternary ammonium compound is a tetra-alkyl ammonium halide or nitrite wherein at least one of alkyl groups is a hydrocarbon radical derived from tall oil, tallow, soy bean oil, coconut oil or cottonseed oil. The polymeric polyamine is the product derived by heating an aliphatic primary monoamine or an N-aliphatic hydrocarbyl alkylene diamine with epichlorohydrin.
(34) Alcohol, which is a mono- or polyhydric alcohol having 2-5 carbon atoms
(35) Polyoxyethylene alkyl ether sulphonate, polyoxyethylene alkylphenyl ether sulphonate and their salts, (b) polyoxyethylene alkyl ether phosphate and its salts and esters and (c) polyalkyl (meth) acrylates,
(36) KEROSTAT CE 5009® (BASF) consisting of a mixture of chromium oleoyl anthranilate, calcium medialant [sic] and di-tert-butylphenol,
(37) Antistatic agents reviewed by G. Balbach in "Kunststoffe," 67, (1977) and discussed in European Patent No. A1 0,107,127.
(38) A chromium salt of a 14-18C alkyl-salicyclic acid, a chromium salt of stearylanthranilic acid, a calcium salt of dioctyl or didecyl sulphosuccinate, a calcium salt of Medialan acid (RTM) or a mixture. As an example, ASA 3® (RTM: mixture of Cr alkylsalicylate and Ca dialkyl sulphosuccinate).

Such transition aid agents that exhibit antistatic properties may be added directly to the reactor at some point during the transition as single aliquots or continuously. Such transition aid agents may further be placed on the cocatalyst adsorbing agent and be so carried into the polymerization system.

The cocatalyst adsorbent agent can also be treated with a cocatalyst-type compound in an effective amount that still provides active sites on the adsorbent material to effectively scavenge any residual compounds in the polymerization system capable of causing further polymerization with the Ziegler-Natta catalyst or inhibiting the polymerization of the chromium-based catalyst. The cocatalyst-type compound may also help reduce the build up of static electricity that may occur when the adsorbing agent is introduced into the reactor. In one embodiment, the cocatalyst-type compound comprises an organo metallic compound represented by the formula: BR$_3$ or AlR$_{(3-a)}$X$_a$, where R is a hydride, branched or straight chain alkyl, cycloalkyl, heterocycloalkyl, aryl radical having from 1 to 30 carbon atoms, X is a halogen and a is 0, 1 or 2. Other non-limiting examples of organo metallic compounds are alkyl compounds where B is one of zinc, magnesium or lithium. The cocatalyst-type compound may be the same or different than that of the Ziegler-Natta cocatalyst. In another embodiment, the cocatalyst-type compound comprises triethyl aluminium. The concentration of cocatalyst-type compound agent preadsorbed on the cocatalyst adsorbing material is in the range of from 0.1 to 20 wt %, or in the range of from 1 to 15 wt % or in the range of from 3 to 8 wt %, based on the total weight of CAA and cocatalyst-type compound. The cocatalyst adsorbing agent with preadsorbed cocatalyst can further include the preadsorption of transition aid agent.

In the practice of the invention the cocatalyst concentration in the reactor or cocatalyst feed rate to the reactor may be decreased, maintained constant or increased prior to turning off the catalyst and starting the transition. In another embodiment, the cocatalyst concentration is decreased to a level to maintain acceptable catalyst productivity up to 24 hours before starting the transition, in order to reduce the amount of cocatalyst that needs be scavenged to effect the transition. The lower cocatalyst concentration is typically in the range of 50 to 300 ppmw on a resin basis, or 100 to 250 ppmw on a resin basis. This corresponds to approximately a 20 to 40 molar ratio of the active metal in the cocatalyst, often aluminum, to the active metal in the catalyst, often titanium, and the exact ratio further depends upon the productivity of the catalyst and the concentration of the titanium in the resin.

The cocatalyst feed to the reactor may be ceased before stopping the catalyst feed in order to further reduce the cocatalyst concentration in the resin, typically 10 minutes to 6 hours before stopping catalyst, or 1 to 2 hours, which may aid the transitions by decreasing the amount of cocatalyst that must be scavenged from the polymerization system. Alternatively, it is possible to maintain the cocatalyst feed up until the catalyst feed is discontinued. It has also been observed that maintaining the cocatalyst feed after the catalyst is discontinued may have a beneficial effect of preventing possibly deleterious changes in the reactor static voltage measurement and reactor wall skin thermocouples. The cocatalyst feed may be maintained for 10 minutes up to 10 hours, and more typically for 1 to 3 hours. Moreover, the cocatalyst feed rate may be turned down stepwise over time as it is eventually turned off, either before, simultaneous with or after ceasing catalyst feed with the benefit of avoiding deleterious reactor upset.

In the practice of embodiments of the invention, the polymerization reaction from the first catalyst may be allowed to diminish after its feed is discontinued, due to catalyst decay kinetics and the removal of resin and catalyst from the reactor through the resin discharge system as polymer is produced. Typically, this is allowed to proceed from zero hours to 10 hours, or zero hours to 5 hours after stopping catalyst feed before proceeding with the subsequent steps of the transition procedure. In one embodiment that minimizes transition time, the transition proceeds with no time allowed for the polymerization reaction to diminish. Typically, the resin production rate is allowed to diminish to 99% to 1% of the initial rate, or 10 to 70% of the initial rate. Furthermore, the catalyst feed need not be turned off all at once, but can rather be decreased stepwise with the possible benefit of not upsetting the reactor static voltage and operability of the reaction system. This can be accomplished over a period of 10 minutes to 10 hours, or 10 minutes to 3 hours, and can be accomplished in predetermined schedule of decrements or in response to changes or lack of changes in the reactor static voltage probe or the reactor wall skin thermocouples or fluidization indicators such as pressure taps.

In the process of practicing the invention with a gas phase fluid bed polymerization reactor initially operating in condensing-mode wherein a portion of the cycle gas is condensed and enters the fluid bed as a liquid, the reaction system may pass out of condensing into dry-mode operation wherein essentially all the cycle gas enters the fluid bed as a gas without liquid present due to the decrease in resin production rate and decreased cooling requirements by the polymerization reaction. In one embodiment, the reactor, if operating in dry-mode, is transitioned into condensing-mode for at least 1 hour prior to starting the transition. The switch from condensing to dry-mode as the resin production rate decreases during the transition may be accompanied by changes in the cycle gas velocity, which controls the total amount of gas circulating through the reactor, to instantaneously adjust the temperature of the cycle gas entering the fluid bed to pass quickly from condensing to dry-mode. The reactor may alternatively be maintained in condensing-mode throughout the transition by condensing a portion of the cycle gas, separating a liquid stream from the circulating gas stream, heating the gas stream and introducing the liquid and gas separately into the fluid bed. The transition may of course be effected in dry-mode. Condensing operation may resume after the transition following the introduction of the new catalyst, which may be assisted by the introduction of Induced Condensing Agent such as for example hexane or isopentane to the reactor, with the possible benefits of increased dissipation of static electricity as well as increased polymer production rates.

Embodiments of the present invention contemplate various embodiments of the process claimed, which are non-limiting. The polymerization process may be a continuous gas phase polymerization process conducted in a fluidized bed reactor.

All polymerization catalysts including conventional-type transition metal catalysts and chromium-based catalysts are suitable for use in the processes of the present invention. The following is a non-limiting discussion of the various polymerization catalysts useful in the invention.

Conventional-Type Transition Metal Catalysts

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741, the disclosures of which are hereby fully incorporated herein by reference. The conventional-type transition metal catalyst compounds that may be used in the present invention include transition metal compounds from Groups 3 to 17, or 4 to 12, or 4 to 6 of the Periodic Table of Elements.

These conventional-type transition metal catalysts may be represented by the formula: $MR_x$, where M is a metal from Groups 3 to 17, or Groups 4 to 6, or Group 4, or titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, the disclosures of which are hereby fully incorporated herein by reference. Catalysts derived from magnesium, titanium chloride and tetrahydrofuran are contemplated, which are well known to those of ordinary skill in the art. One non-limiting example of the general method of preparation of such a catalyst includes the following: dissolve $TiCl_4$ in THF, reduce the compound to $TiCl_3$ using Mg, add $MgCl_2$, and remove the solvent. Catalysts may undergo a partial preactivation prior to polymerization using one or a mixture of organometallic compounds, as described in U.S. Pat. No. 6,187,866, examples of which include the sequential addition of diethyl aluminum chloride (DEAC) and tri-n-hexyl aluminum (TnHAL).

British Patent Application No. 2,105,355 and U.S. Pat. No. 5,317,036, the disclosures of which are hereby incorporated herein by reference, describe various conventional-type vanadium catalyst compounds. Non-limiting examples of conventional-type vanadium catalyst compounds include vanadyl trihalide, alkoxy halides and alkoxides such as $VOCl_3$, $VOCl_2$(OBu) where "Bu" means "butyl" and $VO(OC_2H5)_3$; vanadium tetra halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an actyl acetonate. Conventional-type vanadium catalyst compounds include $VOCl_3$, $VCl_4$ and $VOCl_2$—OR, where R is a hydrocarbon radical, or where R is a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl and vanadium acetyl acetonates.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164, and 5,869,585 and published EP-A2 0 416 815 A2 and EP-A1 0 420 436, the disclosures of which are hereby fully incorporated herein by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437, the disclosures of which are hereby fully incorporated herein by reference.

For more details on Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495, 5,070,055, the disclosures of which are hereby incorporated herein by reference.

Typically, these conventional-type transition metal catalyst compounds are activated with one or more of the conventional-type cocatalysts described below.

Conventional-Type Cocatalysts

Conventional-type cocatalyst compounds for the above conventional-type transition metal catalyst compounds may be represented by the formula $M^3M^4{}_vX^2{}_cR^3{}_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, the disclosures of which are hereby fully incorporated herein by reference.

Chromium-Based Catalysts

Chromium-based catalysts suitable for use in the present invention include $CrO_3$, chromocene, silyl chromate, and chromyl chloride ($CrO_2Cl_2$). Non-limiting examples are disclosed in U.S. Pat. Nos. 3,709,853, 3,709,854, 3,321,550, 3,242,090, and 4,077,904, the disclosures of which are hereby fully incorporated herein by reference. Other non-limiting examples are discussed in U.S. Pat. Nos. 4,152,502, 4,115,639, 4,412,687, 4,564,605, 4,879,359 and 4,960,741, the disclosures of which are hereby fully incorporated herein by reference. Chromium-based catalyst systems may comprise an additional metal such as where the carrier material (e.g. silica) for the chromium-based catalyst is co-impregnated with, for example, a titanium compound, such as titanium tetra-isopropoxide.

EXAMPLES

Example 1

Transition from Ziegler-Natta to Chromium Oxide Catalyst with Carbon Monoxide

The gas phase fluid bed polymerization reactor was producing a 1 MI, 0.918 g/cc density ethylene-butene copolymer at a reaction temperature of 88° C., 110 psi ethylene partial pressure, 0.10 H2/C2 and 0.32 C4/C2 gas mole ratios, and a production rate greater than 30,000 lb/hr using a slurry of spray dried Ziegler-Natta titanium-based catalyst with a triethyl aluminum (TEAL) cocatalyst cofeed to the reactor of 55 to 1 Al/Ti mole ratio. Twelve hours before stopping the Ziegler-Natta catalyst, the TEAL cocatalyst feed was reduced to a target 40:1 Al/Ti mole ratio. Reaction conditions were maintained except that the process of increasing the H2/C2 gas mole ratio started with the intent of reaching 0.30 at the end of the transition procedure. An hour after stopping the catalyst feed, the TEAL cocatalyst cofeed was also stopped, while maintaining the Ziegler-Natta polymerization conditions of temperature, pressure and gas compositions, except for the H2/C2 gas mole ratio, which was in the process of increasing to 0.30. Carbon monoxide was added to the reactor cycle gas to a concentration of 0.5 ppmv three hours after stopping the TEAL feed, and the polymerization reaction ceased. The addition of Grace Davison 955 silica dehydrated in nitrogen at 200° C. was started after introducing carbon monoxide, and was added semi-continuously over two hours to reach a concentration of 1000 ppmw in the reactor on a resin basis. The superficial gas velocity was lowered to 0.6 m/s (1.96 ft/sec) prior to silica addition. Circulation of the silica continued for an additional 2 hours during which time the C4/C2 gas mole ratio was lowered to 0.07, the increase of the H2/C2 gas mole ratio continued and reached 0.30 and the reactor bed temperature was increased to 90° C. A vent was taken from the reactor during the two hour silica circulation period to remove carbon monoxide from the reactor system. Addition of a chromium oxide catalyst treated with tetraisopropyl titanate and activated in at 825° C. started after the two hour circulation period at 75% of the expected final catalyst addition rate. Polymerization reaction was observed within 15 minutes of starting the chromium oxide catalyst feed and the catalyst feed rate increased over time to achieve the target resin production rate. Oxygen was introduced to the reactor cycle gas at a rate of 100 ppbv on an ethylene feed basis after producing 4000 lbs of product, and after making about two bed-turn-overs of resin. The H2/C2 gas mole ratio was then decreased steadily from 0.3 to 0.030 and the ethylene partial pressure was increased from 110 to 200 psia. The reactor operated well on the chromium oxide catalyst without excursions of the reactor wall skin thermocouples and without polymer sheet or agglomerate formation.

Counterexample 2

Transition from Ziegler-Natta to Chromium Oxide Catalyst Without Carbon Monoxide The gas phase fluid bed polymerization reactor was producing a 1 MI, 0.918 g/cc density ethylene-butene copolymer at a reaction temperature of 88° C., 100 psi ethylene partial pressure, 0.10 H2/C2 and 0.32 C4/C2 gas mole ratios, and a production rate greater than 30,000 lb/hr using a slurry of spray dried Ziegler-Natta titanium-based catalyst with a triethyl aluminum (TEAL) cocatalyst cofeed to the reactor at 55 to 1 Al/Ti mole ratio. Twelve hours before stopping the Ziegler-Natta catalyst, the TEAL cocatalyst feed was reduced to a target 40:1 Al/Ti mole ratio. Reaction conditions were maintained except the process of increasing the H2/C2 gas mole ratio started with the intent of reaching 0.30 at the end of the transition procedure. An hour after stopping the catalyst feed, the TEAL cocatalyst cofeed was also stopped, while maintaining the Ziegler-Natta polymerization conditions of temperature, pressure and gas compositions, except for the H2/C2 gas mole ratio, which was in the process of increasing to 0.30. The addition of Grace Davison 955 silica dehydrated in nitrogen at 200 C was started after the resin production rate had decreased to 10% of its original value, and added semi-continuously over two hours to reach a concentration of 1000 ppmw in the reactor on a resin basis. Negative deviations in the reactor static voltage measurement from neutral and a broadening of the static band accompanied the addition of the silica to the reactor, as well as transient low temperature cold-bands registered by the reactor wall skin thermocouples within the fluid bed. The superficial gas velocity was lowered to 0.6 m/s (1.96 ft/sec) prior to silica addition. Circulation of the silica continued for an additional 2 hours during which time the C4/C2 gas mole ratio was lowered to 0.07, the increase of the H2/C2 gas mole ratio continued and reached 0.30 and the reactor bed temperature was increased to 90° C. Addition of a chromium oxide catalyst treated with tetraisopropyl titanate and activated in air at 825° C. started after the two hour circulation period at 75% of the expected final rate. Polymerization reaction was observed within 15 minutes of starting the chromium oxide catalyst feed and the catalyst feed rate increased over time to achieve the target resin production rate. Oxygen was introduced to the reactor cycle gas at a rate of 100 ppbv on an ethylene feed basis after producing 4000 lbs of product, and after making about two bed-turn-overs of resin. The H2/C2 gas mole ratio was then decreased from 0.3 to 0.030 and the ethylene partial pressure was increased from 110 to 200 psia. The static voltage measurement continued with a broader than normal band around zero volts with transient negative deviations, and the reactor wall skin thermocouples continued to register lower than normal. Within the first bed-turn-over of resin from the reactor, positive deviations of the reactor wall skin thermocouples above the average bed temperature indicated the formation of polymer agglomerates along the reactor wall, and shortly afterwards, the agglomerates, typically referred to as sheets, were detected in the polymer discharged from the reactor. The catalyst feed was stopped, the transition was aborted, the reactor was shutdown and the bed of resin was removed from the reactor to clear the sheets from the system.

Examples 3 through 9

Lab-scale slurry polymerizations were conducted using a chromate ester-based catalyst on a dehydrated sized-silica support, to investigate the polymerization effects of AS-990. Polymerizations were conducted batch-wise in 600 ml isobutane at 95° C. with 10 ml hexene and 500 standard cc's of hydrogen with a total pressure of 460 psig largely comprising ethylene. The results are summarized in Table 1 below and demonstrate that the deactivating effect of AS-990 is ameliorated by prereaction of the AS-990 with a near stoichiometric amount of aluminum alkyl. The AS-990 and aluminum alkyl were introduced on a molar equivalence basis based upon the chromium present with the catalyst. The AS-990 was added directly to the polymerization vessel and not premixed with the catalyst. The aluminum alkyl and AS-990 were premixed in the polymerization vessel in Examples 7 and 8 prior to the introduction of the catalyst. In Example 9, the aluminum alkyl and AS-990 were first premixed at a 1:1 mole ratio in the polymerization vessel, before adding an additional 0.5 equivalent of AS-990 before introducing the catalyst.

TABLE 1

| Test | Catalyst | YIELD (g) | Flow Index | Act.gPE/ gcat-1 hr | Bulk Density (g/cc) | Den. g/cc |
|---|---|---|---|---|---|---|
| | Equivalents based on Cr in the catalyst. | | | | | |
| 3 | Standard RunChromium Catalyst | 188 | 86.0 | 551 | 0.48 | 0.9581 |
| 4 | Chromium Catalyst + 0.5 AS 990 | 181 | 90.3 | 369 | 0.42 | 0.9598 |
| 5 | Chromium Catalyst + 1.0 AS 990 | 0 | n/d | n/a | n/a | n/a |
| 6 | Standard Chromium Catalyst | 167 | 80.2 | 478 | 0.47 | 0.9578 |
| 7 | Chromium Catalyst + (1 TEAL + 1 AS 990) | 176 | 59.0 | 458 | 0.46 | 0.9599 |
| 8 | Chromium Catalyst + (1 TEAL + 1.5 AS 990) | 9 | n/d | 24 | n/a | n/a |
| 9 | Chromium Catalyst + (1 TEAL/1 AS 990 + 0.5 AS 990) | 183 | 52.7 | 266 | 0.41 | 0.9596 |

Examples 10 through 13

Lab-scale slurry polymerizations were conducted using a chromate ester-based catalyst, to investigate the polymerization effects of oleic acid. Polymerizations were conducted batch-wise in 600 ml isobutane at 95° C. with 10 ml hexene and 500 standard cc's of hydrogen with a total pressure of 460 psi largely comprising ethylene. The results are summarized in FIG. A for the experiments herein listed: Example 10 was standard operation with the chromate ester-based catalyst; Example 11 was the chromate ester-based catalyst with the addition of 0.5:1 oleic acid to chromium on a molar basis to the reactor; Example 12 was the catalyst with the addition of 1:1 oleic acid to chromium on a molar basis and also the addition of TEAL on a 1:1 molar basis relative to the oleic acid, with the compounds added to the reactor; and Example 13 was the catalyst with 1:1 oleic acid to chromium added on a molar basis to the reactor. The results show little effect of oleic acid on catalyst productivity up to a 0.5:1 oleic acid to chromium ratio, but a substantial loss in productivity at a 1:1 ratio. The addition of TEAL was shown to restore catalyst productivity in the presence of sufficient oleic acid to otherwise result in catalyst deactivation. The use of TEAL with oleic acid improved the productivity to greater than that of the chromate ester-based catalyst alone.

Examples 14 through 16

A nominal 14-inch diameter pilot-scale gas phase 100-lb fluidized bed polymerization reactor was used to evaluate the effects of various treated Davison Grace 955 silicas on the reactor static voltage measurement and reactor wall skin thermocouples during the first stages of a Ziegler-Natta to chromium-based catalyst transition. The silica treatments were as follows: silica dehydrated at 200° C. in Example 14; silica dehydrated at 600° C. in Example 15; and silica dehydrated at 600° C. with treatment with triethyl aluminum at a 5.8 wt % concentration in Example 16 (TEAL on Silica, or TOS). The results are presented in FIG. 9, showing the first stage of three simulated transitions from a dry-fed Ziegler-Natta-type catalyst using the treated silicas. The response of each was monitored. The full transitions were not completed. Instead, the polymerization system was returned to Ziegler-Natta operation by resuming the TEAL feed and restarting the dry-fed catalyst. The polymer produced by the Ziegler-Natta catalyst had a melt index (I2) of 1 dg/min and an ASTM density of 0.918 g/cc, and was produced at a fluidized bed temperature of 85° C., a total reactor pressure of 350 psig, an ethylene partial pressure of 110 psi with hydrogen used to control the polymer molecular weight at a 0.16 H2/C2 gas mole ratio and hexene to control the polymer crystallinity at a 0.13 C6/C2 gas mole ratio. The triethyl aluminum TEAL cocatalyst was present at a concentration of 170 ppmw on a resin basis in the reactor, which corresponded to a 35 to 40 Al/Ti mole ratio relative to the active metal on the catalyst. Polymer was produced at a rate of 30 to 35 lb/hr and discharged semi-continuously from the polymerization system to maintain the target weight of the fluidized bed. The superficial gas velocity moving through the fluid bed was 2.1 ft/sec in all examples except for Example 14, which began at 1.9 ft/sec and was increased to 2.1 ft/sec part way through the test as noted in FIG. 9. In these examples, the TEAL was turned off prior to discontinuing the catalyst feed at the start of each test, but TEAL could also have been turned off simultaneously with stopping catalyst feed, or turned off several minutes to an hour or two or more after stopping the catalyst in order to avoid or mitigate the static and skin thermocouple activity associated with turning off the cocatalyst prior to stopping the catalyst. The hexene feed was stopped in all cases when the reaction rate had decreased by 70%, which was prior to silica addition. The C6/C2 gas mole ratio was allowed to decrease with a lower target of 0.03 C6/C2, before being returned to setpoint to restart the Ziegler-Natta polymerization. The H2/C2 gas mole ratio was maintained at 0.16, the ethylene partial at 110 psi, and the fluid bed temperature at 85° C. throughout the tests. Carbon monoxide at 4 ppmv in the cycle gas was injected in Example 16 at 20 minutes after the TOS injection to determine its effect if any on the existing static voltage and wall skin thermocouple activity. There seemed to be no change in either, but this does not necessarily mean that it did not prevent or reduce additional skin thermocouple or static activity.

Based on the relative broadening of the static voltage band and the decrease of the wall skin thermocouples in FIG. 9, the 600° C. silica evoked the greatest response. The 200° C. silica evoked less of a response and the 600° C. TEAL on silica in combination with carbon monoxide evoked the least response. In all cases the static voltage and low temperatures of the skin thermocouples was brought under control by the addition of AS-990 as a 10 wt % slurry in purified Kaydol mineral oil, often within the first few minutes of starting its addition. The reintroduction of TEAL to the reactor caused an increase in static voltage response and a temporary suppression of the selected skin thermocouples for the 200° and 600° C. silica cases, but the TEAL on silica with carbon monoxide case was relatively free of static and skin thermocouple activity when the TEAL was reintroduced.

Example 17

A pilot plant gas phase reactor like that of Examples 14 through 16 was used for this study to examine a titanium-based Ziegler-Natta to chromate ester-based chromium catalyst transition that used carbon monoxide, 600° C. dehydrated silica and AS-990. The reactor initially operated under Ziegler-Natta conditions using a dry-fed catalyst producing a 1 MI (I2), 0.925 g/cc ASTM density ethylene-hexene copolymer at an 85 C reaction temperature with an 80 lb bed weight and a 1.9 ft/sec superficial gas velocity. The cocatalyst was TEAL with a concentration in the resin of 170 ppmw. Catalyst and cocatalyst feed were discontinued simultaneously, and carbon monoxide introduced within three minutes thereafter to the reaction system as a 100 ppmv solution in nitrogen gas under pressure at a controlled feed rate of 1450 millipounds per hour over a period of 1 hour and 47 minutes until the reaction reached complete deactivation as evidenced by the difference in temperature between the inlet cycle gas below the distributor plate and the temperature of the resin in the bed. This was followed ten minutes later by the introduction of 57 grams of Davison Grace 955 silica activated at 600° C., which was accompanied by a slight broadening in the band width of the reactor static voltage measured in the bed and by no change or essentially no change in the values recorded by the reactor wall skin thermocouples that remained the same or deviated negatively only 1° C. These responses are recorded in FIG. 10, which includes a timeline of steps in the transition procedure. Sixteen minutes later the processes were started of raising the reaction temperature to 92° C., increasing the ethylene partial pressure to 200 psi and increasing the total reactor pressure from 300 to 350 psig, which caused the voltage band to narrow and a transient decrease in some of the skin thermocouples in the bed of 1 to 2 C. A skin TC above the bed in the inverted truncated cone section experienced a transient decrease that reached to 10° C. lower than the average bed temperature. The 10 cc/hr addition of a 10 wt % solution of AS-990 in Kaydol mineral oil was started an hour later, which lasted for 30 minutes and caused no apparent changes in the voltage measured or the wall skin thermocouples. The hexene concentration in the reactor declined from 3 mole % to 0.25 mole % over the course of the transition due to a continuous vent from and gas make up to the reactor, which avoided the need for additional pressure purging to remove the hexene. The mole ratio of hydrogen to ethylene was maintained at 0.16 throughout the transition. The polymerization reaction started almost immediately with the addition of the chromium-based catalyst, which was 30 minutes after stopping the AS-990 addition. An exotherm of the wall skin thermocouple located 0.5 ft above the distributor plate began 45 minutes later, and it reached a temperature 6° to 7° C. above the bed temperature. The catalyst feed was discontinued after an hour and 20 minutes of addition to the reactor, and the skin thermocouple reading slowly decreased to a normal value below the bed temperature. Additional AS-990 was added during this time. The transition cone wall skin thermocouple exceeded the bed temperature during the time that the catalyst feed was interrupted. The catalyst feed was resumed 45 minutes after having turned it off, at an addition rate that was half of that used before, and the reactor static voltage and reactor wall skin thermocouples stabilized within normal tolerances within an hour. The reactor was operating well following the restart of catalyst feed, and the bed weight was increased to 180 lbs over the next several hours. This brought the bed height up to 9 to 10 feet, which was near to the height of the straight section. For comparison, the Ziegler-Natta bed was operated in the pilot facility at a height of 5 feet.

This example demonstrated that the addition of carbon monoxide before the addition of the silica greatly ameliorated the effects of the silica on the static voltage and wall skin thermocouple responses, which in Example 15 and FIG. 9 in the absence of carbon monoxide caused a dramatic increase in the static voltage and a decrease in skin thermocouples to as much as 20° C. below the bed temperature. The example also demonstrated that essentially stoichiometric amounts of carbon monoxide can be added to terminate the Ziegler polymerization without putting much excess into the cycle gas, which with the normal vents from the reaction system did not require additional pressure purging or specific steps to remove the carbon monoxide prior to introducing and initiating polymerization with the silyl-chromate chromium-based catalyst. The carbon monoxide was added continuously at a low rate during the transition process, but could have been added in pre-measured pressurized volumes or aliquots to mini-kill or micro-kill the reactor. Successive mini- and/or micro-kills can be taken until the polymerization is just terminated. Other deactivating compounds such as carbon dioxide and other agents mentioned in this application may be employed in a similar fashion. The example showed essentially no change in static voltage or skin thermocouple response for the levels of AS-990 added, but the voltage and skin thermocouples readings were already within normal tolerances. The example demonstrated a time from Ziegler catalyst off to chromium catalyst on of four and a half hours, which may be further decreased by one skilled in the art by optimizing the transition procedure by means such as for example, injecting the deactivating agent faster, changing the silica circulation time, eliminating times that nothing is done, combining steps such as AS-990 addition with the silica, or by eliminating the AS-990 addition step. Catalyst off to catalyst on times of less than 2 hours and 1 hour may be achieved. The example demonstrates that excessive chromium catalyst addition early in the transition may sometimes have deleterious effects, as the feed rate was sufficient to achieve a resin production rate corresponding to greater than 10 lb/hr/ft3 STY for the nominal 80 lb bed weight that filled only half the possible reactor bed volume. Restarting the catalyst feed at a lower rate and then increasing the bed weight to 180 lbs resulted in good operation and eventual resin production rates reaching 8 lb/hr/ft3 STY as the catalyst feed rate was increased.

Example 18

A pilot gas phase reactor like that of Examples 14 through 17 was used for this study to examine a Ziegler-Natta to chromate ester-based chromium catalyst transition using 200° C. silica, carbon monoxide and AS-990. It initially operated under Ziegler-Natta conditions using a dry-fed titanium-based Ziegler-Natta catalyst producing a 1 MI (I2), 0.920 g/cc ASTM density ethylene-hexene copolymer at an 85 C reaction temperature with an 100 lb bed weight and a 2.1 ft/sec superficial gas velocity. The TEAL cocatalyst concentration in the resin was 170 ppmw. The details of the transition are laid out in the annotated time lines of FIG. 11 that plot the static voltage and reactor wall skin thermocouple measurements recorded during the transition. The transition was purposely protracted for the purpose of recording the effects of each step in the sequence.

The TEAL cocatalyst feed was first discontinued and the Ziegler-Natta catalyst addition was stopped an hour later. The polymerization reaction was allowed to dissipate to 10 to 20% of its original rate prior to the injection of 1900 ppmw of 200° C. silica (on a resin bed weight basis), which caused an increase in the static voltage band width and cold-banding of several skin thermocouples. The addition of 4 ppmv of carbon monoxide to the cycle gas 35 minutes later terminated all remaining residual polymerization reaction but did not appear to alter the static voltage or skin thermocouples. Two doses of AS-990 brought the skin thermocouples back to the normal range and returned the static voltage to zero volts with a narrow bandwidth. Static voltage moved positive and skin thermocouple cold-bands returned as the temperature and gas composition were adjusted to chromium catalyst conditions, which were somewhat ameliorated by a reactor vent and pressure purge that aided in decreasing the hexene concentration in the cycle gas. The addition of chromate ester-based catalyst affected both static and skin thermocouples, which eventually stabilized at normal values. The polymerization reaction started normally.

Example 19

A pilot gas phase fluidized bed reactor like that of Examples 14 through 18 was used for this study to examine a Ziegler-Natta to chromate ester-based chromium catalyst transition using 5.8 wt % TEAL on 600° C. silica (600° C. TOS), carbon monoxide and AS-990. It initially operated under Ziegler-Natta conditions using a dry-fed catalyst producing a 1 MI (I2), 0.920 g/cc ASTM density ethylene-hexene copolymer at 85° C. with an 100 lb bed weight and a 2.2 ft/sec superficial gas velocity. The TEAL cocatalyst concentration in the resin was 170 ppmw. The details of the transition are laid out in the annotated time lines of FIG. 12 that plot the static voltage and reactor wall skin thermocouple measurements recorded during the transition. The transition was purposely protracted in order to record the effects of each step in the sequence.

The TEAL cocatalyst feed was discontinued and the Ziegler-Natta catalyst addition was stopped an hour later. The hexene feed was turned off and the ethylene partial pressure was increased to 200 psi to aid the productivity of the remaining Ziegler-Natta catalyst in the bed, which diminished its concentration and that of the remaining TEAL cocatalyst in the system. The polymerization reaction dissipated to 10 to 20% of its original rate prior to the injection of 2500 ppmw (on a resin bed weight basis) of 600° C. silica that contained 5.8 wt % TEAL (TOS). Carbon monoxide addition started 10 minutes later and terminated all residual polymerization reaction. The static voltage measurement increased with TOS addition, and some of the skin thermocouples moved closer to bed temperature until the carbon monoxide was first introduced. The static and skin thermocouples returned over time to near-normal ranges as the reaction temperature and cycle gas composition were changed and after variations in the cycle gas velocity and repeated small pressure purges. AS-990 was added over two hours during which time the skin thermocouples continued to mover closer to bed temperature and the static voltage band initially narrowed and then moved positive to 150 volts. The silyl chromate-based catalyst was started with the static voltage at this level and the polymerization began within a few minutes. The reactor operated well except for a brief episode of depressed skin thermocouples 11 hours later, which on the time-line corresponded to back-blowing a bed differential pressure tap with nitrogen into the reactor to clear the port. This common procedure normally has no effect on static voltage or skin thermocouples.

The example demonstrated a successful transition from Ziegler-Natta to chromium-based catalyst using 5.8 wt % TEAL on 600° C. Davison Grace silica. AS-990 was employed, but the reactor static and skin thermocouples were in normal ranges before its introduction, and the initial narrowing of the static band prior to its increase suggests an optimum concentration of AS-990. The static voltage probe and reactor wall skin thermocouples may be used as indicators to guide one skilled in the art in determining the optimum and necessary amount of AS-990 to add during the transition. The initial effect of TOS addition was to bring the depressed skin thermocouples closer to the bed temperature prior to carbon monoxide addition, which suggests some optimization in the procedure that may not employ carbon monoxide or add it earlier in the transition.

Example 20

A pilot gas phase reactor like that of Examples 14 through 19 was used for this study to examine a Ziegler-Natta to chromate ester-based chromium catalyst transition using AS-990. It initially operated under Ziegler-Natta conditions using a dry-fed titanium-based catalyst producing a 1 MI (I2), 0.920 g/cc ASTM density ethylene-hexene copolymer at an 85° C. reaction temperature with an 100 lb bed weight and a 2.2 ft/sec superficial gas velocity. The TEAL cocatalyst concentration in the resin was 170 ppmw. The details of the transition are laid out in the annotated time lines of FIG. 13 that plot the static voltage and reactor wall skin thermocouple measurements recorded during the transition.

The TEAL cocatalyst feed was discontinued and the Ziegler-Natta catalyst addition stopped an hour later. The hexene feed was turned off and the ethylene partial pressure was increased to 200 psi. The polymerization reaction dissipated to 10 to 20% of its original rate prior to starting the AS-990 addition as a 10 wt % slurry in mineral oil at 20 cc/hr to the bed. The polymerization reaction dissipated at an increased rate during AS-990 addition but was not completely terminated at the time AS-990 was stopped. The total amount of AS-990 added corresponded to a 0.5:1 AS-990 to TEAL mole ratio. The depressed wall skin thermocouples in the fluid bed returned to normal levels two hours after starting the AS-990 during which time the static voltage band narrowed to around zero volts before moving positive by several hundred volts. A single pressure purge from 350 to 250 psig was required to lower the hexene concentration in the reactor to that required for chromium catalyst operation. The chromium-based catalyst feed was started to the reactor fluid bed at a low rate and the polymerization reaction started 6 hours later, which was accompanied by a depression of some of the wall skin thermocouple temperatures. The static voltage and skin thermocouple measurements returned to normal levels over time and the reactor operated well.

This example demonstrated a Ziegler-Natta to chromium-based catalyst transition without using silica to adsorb the cocatalyst. The AS-990 was shown to clear skin thermocouple cold-banding during the residual polymerization of the Ziegler-Natta catalyst. The amount of added AS-990 may be optimized by one skilled in the art to that just sufficient to narrow the static band and clear the skin thermocouple cold-banding. This may improve the productivity of the chromium-based catalyst in the transition.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

We claim:

1. A method of transitioning from a first catalyst to a second catalyst in an olefin polymerization reactor, comprising:
    adding to said reactor a deactivating agent (DA) selected from one of carbon monoxide, carbon dioxide, or combinations thereof;
    adding to said reactor a cocatalyst adsorbing agent (CAA), comprising an inorganic oxide selected from one of silica, alumina or combinations thereof;
    wherein said first catalyst comprises at least one conventional Ziegler-Natta catalyst, a cocatalyst, and a support, wherein said second catalyst comprises at least one chromium-based catalyst, wherein said reactor is a gas-phase, fluidized bed reactor, and wherein said CAA is substantially free of transition metals.

2. The method of claim 1, wherein addition of said DA begins at one of; before addition of said CAA, or simultaneously with said CAA.

3. The method of claim 1, wherein said addition of said DA begins at one of; before, during or after stopping feed of said first catalyst and/or cocatalyst, and before beginning of feed of said second catalyst.

4. The method of claim 3, wherein said DA is added to said reactor continuously during polymerization employing said first catalyst, below a concentration effective to deactivate said first catalyst, then the concentration of said DA is increased to said amount effective to deactivate said first catalyst.

5. The method of claim 1, wherein said DA is added to said reactor in an effective amount to terminate polymerization based on said first catalyst.

6. The method of claim 2, wherein said DA is added in one of a single amount effective to terminate polymerization based on said first catalyst or increasing incremental amounts such that the total of said increasing amounts is an effective amount to terminate polymerization based on said first catalyst.

7. The method of claim 1, wherein said DA is added in an amount comprising one of; less than 10%, or less than 5%, or less than 1%, in excess of an amount effective to terminate polymerization of the Ziegler-Natta catalyst.

8. A method of transitioning from a first catalyst to a second catalyst in an olefin polymerization reactor, comprising:
    adding to said reactor a deactivating agent (DA);
    adding to said reactor a cocatalyst adsorbing agent (CAA), comprising an inorganic oxide selected from one of silica, alumina or combinations thereof;
    and wherein said CAA is substantially free of transition metal;

wherein said first catalyst comprises at least one conventional Ziegler-Natta catalyst, a cocatalyst and a support, wherein said second catalyst comprises at least one chromium-based catalyst, wherein said reactor is a gas-phase, fluidized bed reactor.

9. The method of claim 8, wherein said DA is selected from one of carbon monoxide, carbon dioxide, or combinations thereof.

10. The method of claim 8, wherein said DA comprises one of oxygen-containing compounds, hydrogen containing compounds, or combinations thereof.

11. The method of claim 10, wherein said oxygen-containing compounds comprise oxygen, carbon monoxide, carbon dioxide, nitrogen monoxide, nitrogen dioxide, air, sulfur dioxide, carbonyl sulfide, or combinations thereof, and wherein said hydrogen-containing compounds comprise water, alcohols, phenols, carboxylic acids, sulfonic acids, primary amines, secondary amines, ammonia or combinations thereof, and wherein DA is added to said reactor in an effective amount to deactivate said first catalyst, or at a level of one of: 0.002-10 ppmv, 0.1-8 ppmv, or 0.4 to 5 ppmv, based on the total gas volume in said reactor.

12. The method of claim 11, wherein said CAA comprises inorganic oxides.

13. The method of claim 12, wherein said addition of said DA begins at one of: before, during or after stopping feed of said first catalyst and/or cocatalyst.

14. The method of claim 13, wherein said DA is added to said reactor continuously during polymerization employing said first catalyst, below a concentration effective to deactivate said first catalyst, then the concentration of said DA is increased to said amount effective to deactivate said first catalyst.

15. The method of claim 8, wherein said DA is added to said reactor in an effective amount to terminate polymerization based on said first catalyst.

16. The method of claim 8, wherein said DA is added in one of a single amount effective to terminate polymerization based on said first catalyst, or increasing incremental amounts such that the total of said increasing amounts is an effective amount to terminate polymerization based on said first catalyst.

17. The method of claim 8, wherein said DA is added in an amount comprising one of: less than 10%, or less than 5%, or less than 1%, in excess of an amount effective to terminate polymerization of the Ziegler-Natta catalyst.

18. A method of transitioning from a first catalyst to a second catalyst in an olefin polymerization reactor, comprising:
adding a transition aid agent (TAA), wherein said TAA is selected from one of alkoxylated amines, alkoxylated amides, or combinations thereof, wherein said first catalyst comprises at least one Ziegler-Natta catalyst comprising said catalyst, a cocatalyst and optionally a support, and said second catalyst comprises at least one chromium-based catalyst; and wherein said TAA is added to said reactor in an effective amount to react with said cocatalyst.

19. The method of claim 18 wherein said TAA is a C13-C15 ethoxylated amine, an ethoxylated stearyl amine, or combinations thereof.

20. The method of claim 19, wherein said TAA is added to one of: a fluid bed, a freeboard; or before or after a cooler or before or after a compressor, of a gas phase reactor.

21. The method of claim 20, wherein said TAA is added at one of: prior to or after stopping feed of said first catalyst, and before or after stopping feed of a cocatalyst.

22. The method of claim 21, further comprising adding a cocatalyst adsorbing agent (CAA).

23. The method of claim 22, wherein said CAA comprises an inorganic oxide selected from one of silica, alumina or combinations thereof, wherein said CAA is substantially free of transition metals.

24. The method of claim 23, wherein said TAA is added alter said stopping feed of said first catalyst and cocatalyst, but before adding said CAA.

25. The method of claim 18, further comprising adding a deactivating agent (DA).

26. The method of claim 25, wherein said TAA is added simultaneously with, after or before addition of said DA.

27. The method of claim 18, wherein said TAA is added after the start of feeding said second catalyst.

28. The method of claim 27, wherein the method further comprises the addition of a CAA and said TAA is added in multiple aliquots at different times, selected from one of: after addition of a deactivating agent (DA), but before addition of said CAA, after addition of CAA, or during beginning of addition of said second catalyst.

29. The method of claim 28, wherein said TAA is added as one of a solid, a slurry, a liquid, solution or combinations thereof.

30. The method of claim 29, wherein said amines and/or amides comprise varying lengths of fatty acids.

31. The method of claim 30, wherein some or all of said TAA is adsorbed, deposited or impregnated on said CAA, wherein said adsorption deposition or impregnation takes place before addition to said reactor, or said TAA is premixed and cofed with said CAA to said reactor.

32. The method of claims 18, wherein said TAA comprises oleic acid.

33. A method of transitioning from a first catalyst to a second catalyst in an olefin polymerization reactor, comprising:
adding a cocatalyst adsorbing agent (CAA);
adding a deactivating agent (DA);
wherein said CAA comprises an inorganic oxide, substantially free of transition metals;
wherein the first catalyst is a Ziegler-Natta catalyst (ZN catalyst) and said DA is added during polymerization based on said ZN catalyst, but below concentrations effective to deactivate said ZN catalyst, then increased in concentration to a level effective to deactivate said ZN catalyst.

34. The method of claim 33, wherein said CAA comprises silica, alumina, or combinations thereof.

35. The method of claim 34, wherein said DA is added to said reactor at one of: prior to or simultaneously with stopping feeding of said first catalyst and/or stopping feeding of a cocatalyst.

36. The method of claim 35, wherein said first catalyst is a conventional Ziegler-Natta (ZN) catalyst and said second catalyst is based on chromium.

37. The method of claim 33, wherein said DA is added to said reactor in an amount effective to terminate polymerization based on said first catalyst.

38. The method of claim 33, wherein said DA is added to said reactor prior to said addition of said CAA, or wherein said DA is added to said reactor simultaneously with said CAA, either at a predetermined concentration or in increments, either said predetermined concentration or a total of said increment being an effective amount to terminate polymerization using said first catalyst.

39. The method of claim 38, wherein said DA is added to said reactor in an amount comprising one of; less than 10%, or less than 5%, or less than 1%, in excess of an amount effective to terminate polymerization of the Ziegler-Natta catalyst.

40. The method of claim 38, wherein said CAA is treated with an organo metallic compound represented by one of the formulas: $BR_3$ or $AlR_{(3-a)}X_a$, where R is a hydride, branched or straight chain alkyl, cycloalkyl, heterocycloalkyl, aryl radical having from 1 to 30 carbon atoms, X is a halogen and a is 0, 1 or 2.

41. The method of claim 40, wherein said organo metallic compound is triethylaluminum.

42. A method of transitioning from a first catalyst to a second catalyst in an olefin polymerization reactor, comprising:

first adding an organo metallic compound represented by one of the formulas: $BR_3$ or $AlR_{(3-a)}X_a$, where R is a hydride branched or straight chain alkyl, cycloalkyl, heterocycloalkyl, aryl radical having from 1 to 30 carbon atoms, X is a halogen and a is 0, 1 or 2 to a cocatalyst adsorbing agent (CAA);

then adding said CAA with said organo metallic compound to said reactor;

wherein said CAA comprises an inorganic oxide, substantially free of transition metals.

43. The method of claim 42, wherein said CAA comprises silica, alumina, or combinations thereof, and wherein said organo metallic compound comprises triethyl aluminum.

* * * * *

UNITED STATES PATENT AND TRADEMARK OFFICE
CERTIFICATE OF CORRECTION

PATENT NO. : 7,629,422 B2 Page 1 of 1
APPLICATION NO. : 11/312272
DATED : December 8, 2009
INVENTOR(S) : Goode et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Second Day of November, 2010

David J. Kappos
*Director of the United States Patent and Trademark Office*